(12) United States Patent
Chennavasin et al.

(10) Patent No.: US 11,250,472 B2
(45) Date of Patent: Feb. 15, 2022

(54) METHOD AND SYSTEM FOR PROVIDING ELECTRONIC MARKETING COMMUNICATIONS FOR A PROMOTION AND MARKETING SERVICE

(71) Applicant: GROUPON, INC., Chicago, IL (US)

(72) Inventors: Don Albert Chennavasin, Santa Clara, CA (US); Lawrence Lee Wai, Mountain View, CA (US); Hamish Barney, Chicago, IL (US); Devdatta Gangal, Chicago, IL (US); Daniel Beard, Chicago, IL (US); Valampuri Lakshminarayanan, Chicago, IL (US); Michael Burton, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/062,209

(22) Filed: Oct. 2, 2020

(65) Prior Publication Data
US 2021/0090127 A1 Mar. 25, 2021

Related U.S. Application Data

(63) Continuation of application No. 14/577,320, filed on Dec. 19, 2014, now Pat. No. 10,832,290.
(Continued)

(51) Int. Cl.
*G06Q 30/02* (2012.01)
(52) U.S. Cl.
CPC ..... *G06Q 30/0269* (2013.01); *G06Q 30/0261* (2013.01); *G06Q 30/0267* (2013.01)
(58) Field of Classification Search
CPC .......... G06Q 30/0269; G06Q 30/0267; G06Q 30/0261
(Continued)

(56) References Cited

U.S. PATENT DOCUMENTS

| 8,027,661 | B2 | 9/2011 | Dawson et al. |
| 9,721,267 | B2 | 8/2017 | Fahner et al. |

(Continued)

FOREIGN PATENT DOCUMENTS

| WO | 2009/094395 A1 | 7/2009 | |
| WO | WO-2009094395 A1 * | 7/2009 | ......... G07F 17/3251 |

OTHER PUBLICATIONS

Merchant Paul, Common Marketing Communication Methods, 2013 (Year: 2013).*

(Continued)

*Primary Examiner* — Tarek Elchanti
(74) *Attorney, Agent, or Firm* — Alston & Bird LLP

(57) ABSTRACT

A computer-executable method, a computer system and a non-transitory computer-readable medium are provided for causing electronic marketing communications of one or more promotions to be generated on a mobile computing device associated with a consumer. A method includes programmatically retrieving promotion data indicative of a plurality of promotions from a computer memory. The method includes determining, using processing circuitry, a promotion score for each of the plurality of promotions. Each promotion score is determined based on consumer profile data, stored consumer activity data, and at least one of: current consumer activity data, current local context data, or predicted consumer activity data. The method further includes outputting indications configured to generate electronic marketing communications associated with the plurality of promotions based on the promotion scores of the plurality of promotions.

20 Claims, 22 Drawing Sheets

Related U.S. Application Data

(60) Provisional application No. 61/918,576, filed on Dec. 19, 2013.

(58) Field of Classification Search
USPC .......................................... 705/14.58, 14.42
See application file for complete search history.

(56) References Cited

U.S. PATENT DOCUMENTS

| | | |
|---|---|---|
| 2004/0034570 A1 | 2/2004 | Davis |
| 2008/0103910 A1 | 5/2008 | Gardenswartz |
| 2010/0241508 A1* | 9/2010 | Ikonen ............... G06Q 30/0244 |
| | | 705/14.42 |
| 2011/0106598 A1 | 5/2011 | McCann et al. |
| 2013/0173372 A1 | 7/2013 | Misra et al. |
| 2013/0311286 A1 | 11/2013 | Detwiler |
| 2014/0379467 A1 | 12/2014 | Huang et al. |

OTHER PUBLICATIONS

KF Lehman, Marketing communications, 2008 (Year: 2008).
U.S. Patent Application filed Mar. 31, 2014; In re: Wai entitled "Predictive Recommendation System Using Contextual Relevance", U.S. Appl. No. 14/231,222.
U.S Provisional Patent Application filed Nov. 25, 2013; In re: Wai entitled "Predictive Recommendation System Using Contextual Relevance", U.S. Appl. No. 61/908,599.

* cited by examiner ns associated with the plurality of promotions based on the promotion scores of the plurality of promotions.

In accordance with another exemplary embodiment, a computer system is provided. The computer system includes a storage device configured to store consumer profile data, stored consumer activity data, and at least one of: current consumer activity data, current local context data, or predicted consumer activity data. The computer system also includes processing circuitry configured to determine a promotion score for each of the plurality of promotions. Each promotion score is determined based on consumer profile data, stored consumer activity data, and at least one of: current consumer activity data, current local context data, or predicted consumer activity data. The processing circuitry is also configured to output indications configured to generate electronic marketing communications associated with the plurality of promotions based on the promotion scores of the plurality of promotions.

METHOD AND SYSTEM FOR PROVIDING ELECTRONIC MARKETING COMMUNICATIONS FOR A PROMOTION AND MARKETING SERVICE

CROSS REFERENCE TO RELATED APPLICATIONS

The present application is a continuation of U.S. Nonprovisional application Ser. No. 14/577,320, filed Dec. 19, 2014, which claims priority to U.S. Provisional Application No. 61/918,576, filed Dec. 19, 2013, the entire contents of which are incorporated herein by reference.

TECHNOLOGICAL FIELD

Example embodiments of the present invention relate generally to promotion management and, more particularly, to providing electronic marketing communications of promotions to consumers.

BACKGROUND

Via electronic networks (e.g., the Internet), promotional systems provide promotions associated with merchants to consumer devices. Certain promotional and marketing services notify consumers about promotions that may be of relevance and interest to the consumers. In this regard, areas for improving current promotion notification techniques have been identified and technical solutions have been implemented in exemplary embodiments.

BRIEF SUMMARY

In accordance with one exemplary embodiment, a computer-executable method is provided for providing electronic marketing communications to a mobile computing device associated with a consumer. The method includes programmatically retrieving promotion data indicative of a plurality of promotions from a computer memory. The method also includes determining, using processing circuitry, a promotion score for each of the plurality of promotions. Each promotion score is determined based on consumer profile data, stored consumer activity data, and at least one of: current consumer activity data, current local context data, or predicted consumer activity data. The method further includes outputting indications configured to generate electronic marketing communications associated with the plurality of promotions based on the promotion scores of the plurality of promotions.

In accordance with another exemplary embodiment, one or more non-transitory computer-readable media are provided. The computer-readable media have encoded thereon one or more computer-executable instructions for performing a method for providing electronic marketing communications to a mobile computing device associated with a consumer. The method includes programmatically retrieving promotion data indicative of a plurality of promotions from a computer memory. The method also includes determining, using processing circuitry, a promotion score for each of the plurality of promotions. Each promotion score is determined based on consumer profile data, stored consumer activity data, and at least one of: current consumer activity data, current local context data, or predicted consumer activity data. The method further includes outputting indications configured to generate electronic marketing communica-

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
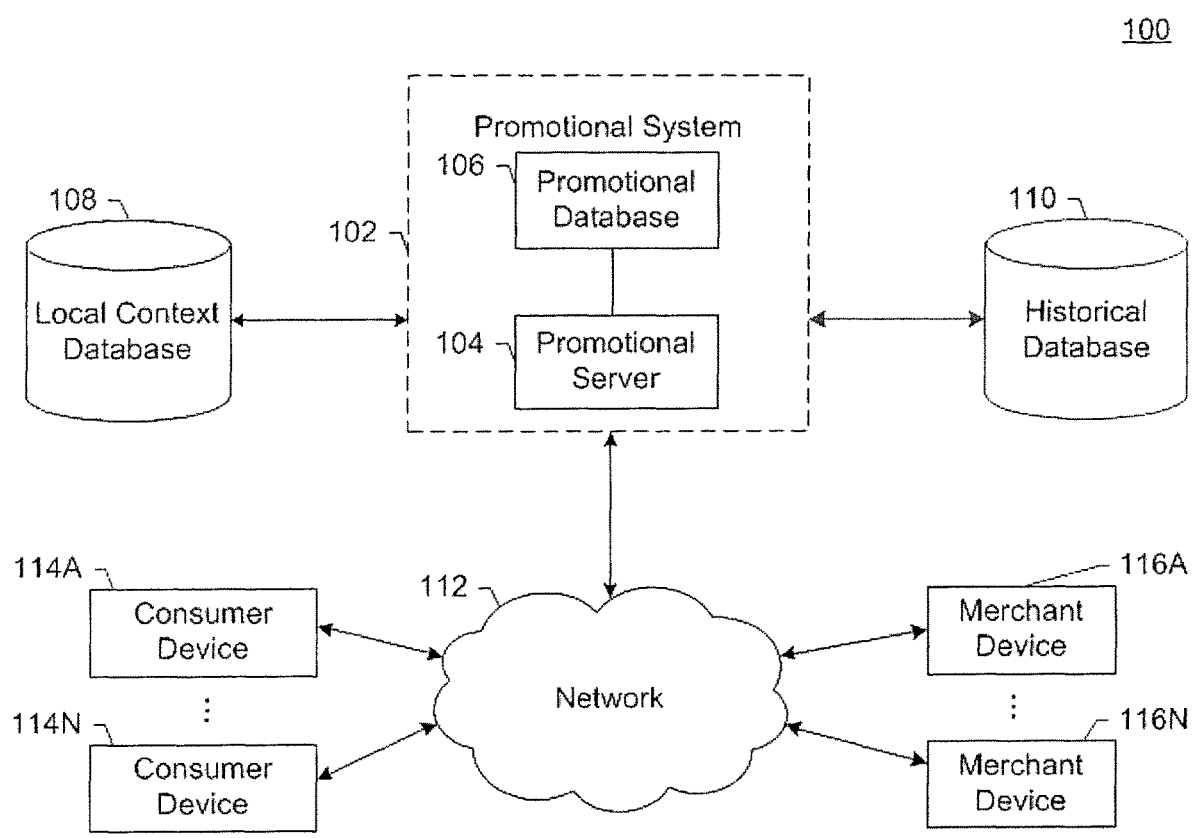
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for providing electronic marketing communications of one or more promotions to a consumer using a promotion and marketing service. The ability to recommend promotions for purchase that are of particular relevance to each consumer is important in a promotion and marketing service as it helps maintain an active and engaged customer base and maximize profits for the service. Electronic marketing communications provided to a consumer, especially on a mobile computing device, can be intrusive. As such, it is critical to provide electronic marketing communications with relevant promotions and to explicitly or implicitly empower consumers to control the electronic marketing communications that they receive.

Exemplary embodiments provide technical solutions for analyzing and leveraging information in profile and activity data of consumers to generate automatic recommendations or offers of promotions that are targeted and relevant to consumers. For example, certain exemplary embodiments may determine a set of promotions for which electronic marketing communications should be generated, based on consumer profile data, stored consumer activity data, and at least one of: (i) current consumer activity data, (ii) current local context data, and/or (iii) predicted consumer activity data. The promotions are programmatically selected from available promotions to ensure that they are relevant to the consumer and take into account local context data.

In some embodiments, the electronic marketing communications may be generated according to a push notification protocol in which a promotional server initiates transmission of indications configured to generate electronic marketing communications on a mobile computing device or consumer interface associated with a consumer. Certain exemplary embodiments may enable a consumer to specify certain types of electronic marketing communications he/she wishes to receive as push notifications. In other embodiments, the electronic marketing communication may be generated according to a pull notification protocol in which a request for the indications may be initiated by the consumer interface or the mobile computing device associated with the consumer.

The exemplary system for providing electronic marketing communications reliably handles personalized notifications of promotions for all types of notification channels for each consumer (e.g., webpage, mobile app, email) and for all types of computing devices associated with each consumer (e.g., mobile computing device, smartphone, personal computer). In some cases, the same electronic marketing communication may not be provided to a consumer using multiple notification channels (for example, both email and mobile app) to avoid spamming the consumer with redundant information.

Additionally, exemplary embodiments provide computer systems, computer-executable methods and one or more non-transitory computer-readable media for providing electronic marketing communications of promotions to consumer interfaces during automatically selected time periods that are deemed appropriate for a consumer. The ability to recommend promotions for purchase at appropriate times is important in a promotion and marketing service as it increases the likelihood that the consumer will view and consider purchasing a promotion. This capability avoids a scenario in which a consumer ignores a promotion because an electronic marketing communication for the promotion was provided at a time when the consumer was unlikely to be interested in its purchase or at a time when the consumer was likely to be engaged in other endeavors. Thus, the ability to determine appropriate time periods for providing electronic marketing communications also helps maintain an active and engaged customer base and maximize profits for the service.

I. DEFINITIONS OF TERMS

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "promotion sharing activity," may include any activity performed by a first consumer that causes a promotion to be offered to a second consumer.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "interest indication" refers to an indication generated by a consumer in relation to a promotion, the interest indication indicating one or more of: purchase of the promotion by the consumer, viewing of the promotion by the consumer, rating of the promoting by the consumer, any activity performed by the consumer indicating a willingness to purchase the promotion (e.g., by adding it to a wish-list, by adding it to a favorites list), and the like.

As used herein, the terms "association," "consumer association" and "promotion sharing association" are used interchangeably to refer to a link or relationship between two or more consumers indicating that a promotion offered to one of the consumers should also be offered to the other consumers. A promotion sharing association may be programmatically generated and stored in a consumer association database in some exemplary embodiments.

As used herein, the term "association score" for an association between two or more consumers refers to a programmatically determined likelihood that a promotion offered to the consumers will generate purchases by all of the consumers in the association.

As used herein, the term "consumer association database" refers to a data structure or any suitable data storage structure that stores data indicating one or more promotion sharing associations between consumers. The consumer association database may identify two or more consumers in each promotion sharing association. In some embodiments, the consumer association database may include additional information, e.g., whether a promotion sharing association is general for all categories of promotions, whether a promotion sharing association is based on a specific category of promotions (e.g., only travel-related promotions), whether a promotion sharing association is unidirectional (e.g., promotions purchased by a first consumer may be automatically offered to a second consumer, but those purchased by the second consumer may not automatically be offered to the first consumer), whether a promotion sharing association is bidirectional (e.g., promotions purchased by a first consumer may be automatically offered to a second consumer, and vice versa), and the like.

As used herein, the term "vector" refers to a digitally generated representation of profile data and/or activity data associated with a consumer as a vector in multidimensional space. The multi-dimensional space may map a consumer to his/her profile data and activity data in order to facilitate a machine learning system implementing a machine learning algorithm embodied on one or more computer-readable media.

As used herein, the term "training vector" refers to a vector that may be used in training a machine learning system implementing a machine learning algorithm embodied on one or more computer-readable media.

As used herein, the term "testing vector" refers to a vector that may be used in testing a trained machine learning system implementing a machine learning algorithm embodied on one or more computer-readable media.

As used herein, the term "machine learning system" refers to a computing system implementing a machine learning algorithm embodied on one or more computer-readable media.

As used herein, the term "computer-readable medium" refers to a non-transitory storage hardware, non-transitory storage device or non-transitory computer system memory that may be accessed by a controller, a microcontroller, a computational system or a component of a computational system to encode thereon computer-executable instructions or software programs. The "computer-readable medium" may be accessed by a computational system or a component of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. EXEMPLARY PROMOTION AND MARKETING SERVICE

Some embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotional system 102 may have access to a local context database or any suitable data storage structure 108 that stores data indicating aspects of different geographical locations and areas (e.g., local merchants, local events scheduled at different times, geographical terrain, geographical obstacles like a bay or mountains), and a historical database 110 storing information regarding consumer profile data and prior activities performed by consumers. In various embodiments, promotional database 106, local context database 108, and historical database 110 may be distinct databases, or may alternatively refer to a single database.

Figure 2:
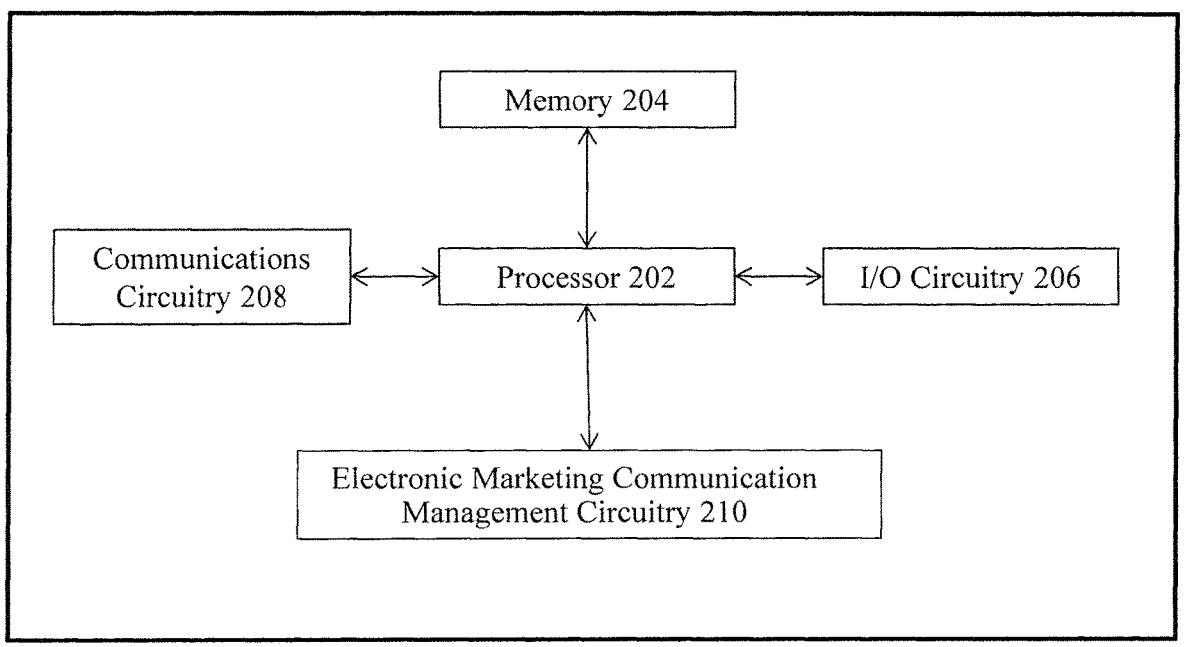
FIG. 2 is a block diagram illustrating exemplary components of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a processor 202, a memory 204, input/output circuitry 206, and communications circuitry 208. In some embodiments, the apparatus 200 may include electronic marketing communication management circuitry 210 configured to determine one or more promotions for which electronic marketing communications are to be provided to a consumer and one or more time periods during which the electronic marketing communications should be provided. In some embodiments, the electronic marketing communication management circuitry 210 may determine and manage other aspects of providing electronic marketing communications, for example, the channel preferred by a consumer (e.g., email or mobile app), a format of the electronic marketing communication preferred by a consumer (e.g., detailed or summary electronic marketing communications), and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry may comprise a user interface and may include a display. In such embodiments, the user interface may comprise a web user interface, a mobile application, a client device, a kiosk, or the like. In some embodiments, the input/output circuitry 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

The communications circuitry 208 may be any means such as a device or circuitry embodied in either hardware or a combination of hardware and software that is configured to receive and/or transmit data from/to a network and/or any other device or component in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
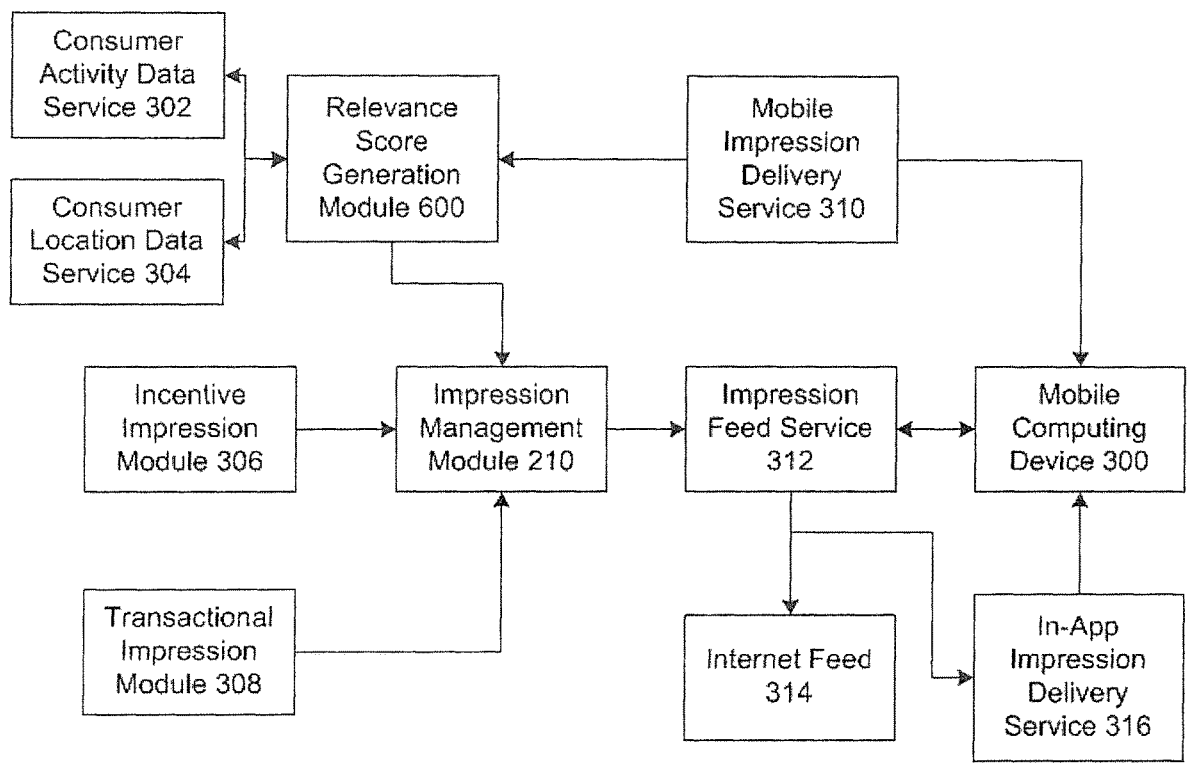
FIG. 3 is a block diagram illustrating exemplary circuitry for providing an electronic marketing communication comprising a notification of a promotion to a consumer using a promotion and marketing service in accordance with some embodiments.

FIG. 3 is a block diagram illustrating an exemplary system for providing electronic marketing communications containing promotions to a consumer interface rendered on a mobile computing device 300 associated with a consumer. An electronic marketing communication management service or circuitry 210 may be provided to determine one or more promotions for which electronic marketing communications should be provided to the computing device 300. The electronic marketing communication management circuitry 210 may not only determine the promotions, but also determine time periods during which the electronic marketing communications should be provided. The electronic marketing communication management circuitry 210 may receive data from promotion score generation circuitry 600, which indicates how relevant the promotions are to a specific consumer. The promotion score generation circuitry 600 may receive, as input, consumer activity data from a consumer activity data service or database 302 and consumer location data from a consumer location data service or database 304. In some embodiments, based on the consumer activity data and the consumer location data, the promotion score generation circuitry 600 may generate information on how relevant certain promotions are to the consumer, and may transmit the information to the electronic marketing communication management circuitry 210. In other embodiments, the promotion score generation circuitry 600 may use a different combination of input data.

In some embodiments, the electronic marketing communication management service 210 may receive information on incentives (for example, heavily discounted promotions) from incentive electronic marketing communication circuitry 306. In some embodiments, the electronic marketing communication management service 210 may receive information on transactional electronic marketing communications from transactional electronic marketing communication circuitry 308. Transactional electronic marketing communications may include electronic marketing communications generated based on prior consumer interaction with a promotion (e.g., an electronic marketing communication notifying the consumer that a product has shipped).

The electronic marketing communication management service 210 may generate indications configured to cause the electronic marketing communications to be rendered on a consumer interface, and may transmit the indications to the consumer device 300 via one or more electronic marketing communication devices services or protocols. For example, in some embodiments, a mobile electronic marketing communication delivery service 310 may receive the indications and use them to cause generation of the electronic marketing communications on the consumer device 300. In some embodiments, the service 310 may relay information about the electronic marketing communications to the promotion score generation circuitry 600. In some embodiments, an electronic marketing communication feed service 312 may receive the indications from the electronic marketing communication management service 210 and generate a web feed of the electronic marketing communications on an Internet webpage or any other suitable consumer interface 314 customized for the consumer. The electronic marketing communication feed service 312 may, in some embodiments, cause a feed of the electronic marketing communications to be rendered on the consumer device 300. The electronic marketing communication feed service 312 may, in some embodiments, provide the indications to an in-app electronic marketing communication delivery service 316.

The in-app electronic marketing communication delivery service 316 may cause the electronic marketing communications to be generated on an application running on the mobile computing device 300.

In some embodiments, the electronic marketing communications may be generated according to a push notification protocol in which the promotional server 104 initiates transmission of indications configured to generate electronic marketing communications on a mobile computing device or consumer interface associated with a consumer. Certain exemplary embodiments may enable a consumer to specify certain types of electronic marketing communications he/she wishes to receive as push notifications. In other embodiments, the electronic marketing communication may be generated according to a pull notification protocol in which a request for the indications may be initiated by the consumer interface or the mobile computing device associated with the consumer.

The exemplary system for providing electronic marketing communications reliably handles personalized notifications of promotions for all types of notification channels (e.g., webpage, mobile app, email) and for all types of computing devices (e.g., mobile computing device, smartphone, personal computer). In some cases, the same electronic marketing communication may not be provided to a consumer using multiple notification channels (for example, both email and mobile app) to avoid spamming the consumer with redundant information.

Figure 4:
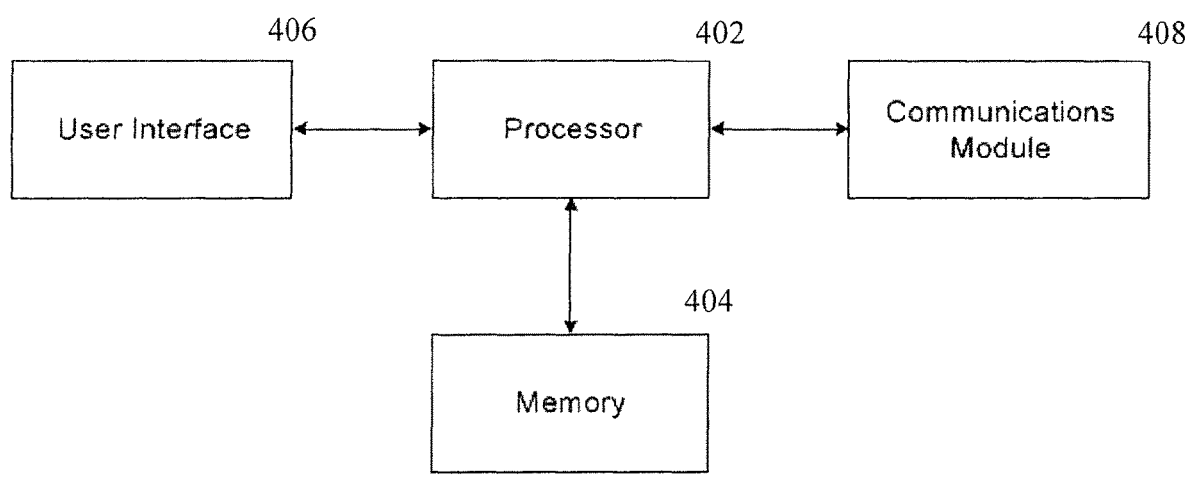
FIG. 4 is a block diagram illustrating exemplary circuitry of a computing device for use by a consumer or merchant in accordance with some exemplary embodiments.

Referring now to FIG. 4, a block diagram is illustrated showing an example end-user device, apparatus 400 that may be configured to enable a user to view promotions from outside the promotional system 102, in accordance with embodiments of the present invention. In FIG. 4, the apparatus 400, which may embody consumer device 114 or merchant device 116, may include or otherwise be in communication with a processor 402, a memory 404, communications circuitry 408, and a user interface 406. In some embodiments, the processor (and/or co-processor or any other processing circuitry assisting or otherwise associated with the processor) may be in communication with the memory 404 via a bus for passing information among components of the apparatus. The memory 404 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include a user interface 406 that may, in turn, be in communication with processor 402 to provide output to the user and, in some embodiments, to receive an indication of a user input. As such, the user interface 406 may include a display and may comprise a web user interface, a mobile application, a client device, a kiosk, or the like. In some embodiments, the user interface 406 may also include a keyboard, a mouse, a touch screen, touch areas, soft keys, a microphone, a speaker, or other input/output mechanisms. The processor 402, or user interface circuitry comprising the processor 402, may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device or component in communication with the apparatus 400 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

III. PROGRAMMATIC SELECTION OF PROMOTIONS FOR A CONSUMER

Figure 5:
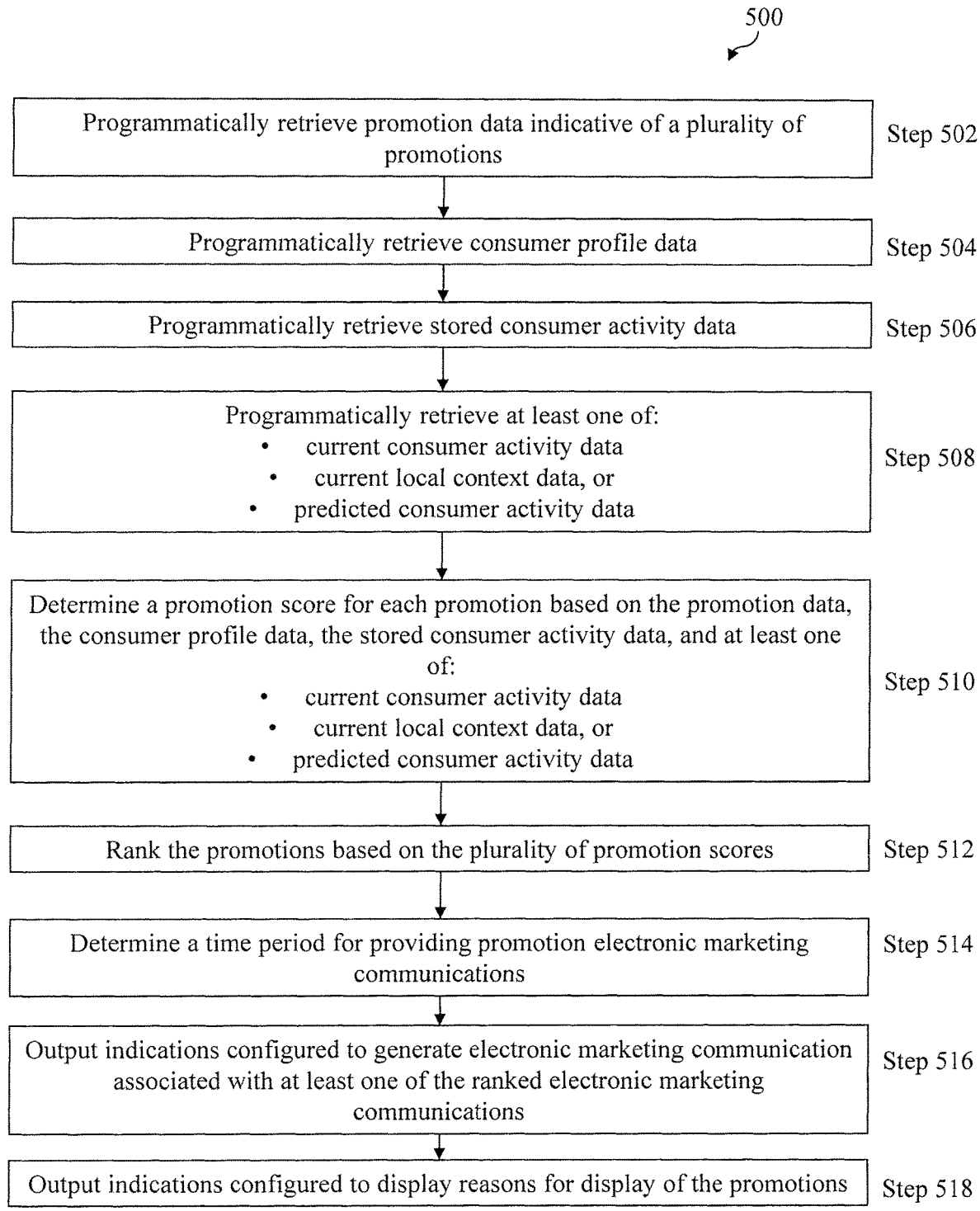
FIG. 5 is a flowchart illustrating an exemplary computer-executable method for providing an electronic marketing communication comprising a notification of a promotion to a consumer using a promotion and marketing service in accordance with some embodiments.

FIG. 5 is a flowchart illustrating an exemplary computer-executable method 500 for providing promotion electronic marketing communications to a mobile computing device or a consumer interface associated with a consumer. In step 502, promotion data indicative of a plurality of promotions may be programmatically retrieved from the promotional database 106. The promotions may be those promotions that are currently available for offer to consumers. For each promotion, the promotion data may include, but is not limited to, an identification of the promotion, one or more categories used to characterize the promotion, one or more categories used to characterize the underlying product or service, one or more sub-categories used to characterize the promotion, one or more sub-categories used to characterize the underlying product or service, a price of the promotion, a percentage discount of the promotion, a redemption time for redeeming the promotion, an availability of the promotion, a time deadline for purchasing the promotion, a tenure of the merchant offering the promotion, a location of the merchant offering the promotion, a rating received by the merchant offering the promotion, and the like.

In step 504, consumer profile data may be programmatically retrieved from, for example, the historical database 110. The consumer profile data may include one or more profile data items of the consumer to whom a promotion electronic marketing communication is to be presented. In some embodiments, the consumer profile data may also include one or more profile data items of one or more additional consumers who may or may not be linked to the consumer in a promotion sharing relationship. Exemplary consumer profile data items may include, but are not limited to, age, gender, race, ethnicity, occupation, income, calendar events, a locational preference for promotions, a merchant preference for promotions, an instrument preference for promotions, a category and/or sub-category preference for promotions, a price preference for promotions, and the like.

In step 506, stored consumer activity data may be programmatically retrieved from, for example, the historical database 110. The stored consumer activity data may include information on one or more prior activities performed by a first consumer to whom a promotion electronic marketing communication is to be presented. In some embodiments, the stored consumer activity data may include information on one or more prior activities performed by one or more additional consumers who may or may not be linked to the first consumer in a promotion sharing relationship. Exemplary stored consumer activity data include, but is not limited to, data on one or more viewing activities performed by a consumer in relation to one or more promotions previously offered to the consumer, data on one or more purchase activities performed by a consumer in relation to one or more promotions previously offered to the consumer, data on one or more rating activities performed by a consumer in relation to one or more promotions previously offered to the consumer, data on one or more promotions added by a consumer to a wish-list or list of favorites, data on one or more physical activities performed by a consumer or motion data (e.g., sleeping, walking, exercising, riding a car, traveling to a particular location, being in the vicinity of a particular store), and the like.

In step 508, one or more of the following data items may be generated or retrieved from a database or external system: (i) current consumer activity data, (ii) current local context data, and/or (iii) predicted consumer activity data.

The current consumer activity data may include information on one or more activities currently performed by a first consumer to whom a promotion electronic marketing communication is to be presented, and/or data on one or more activities performed by the first consumer in the recent past (for example, within any suitable predetermined time period, e.g., on the order of seconds, minutes or hours). In some embodiments, the current consumer activity data may include information on one or more activities currently performed by one or more additional consumers who may or may not be linked to the first consumer in a promotion sharing relationship, and/or data on one or more activities performed by the one or more additional consumer in the recent past (for example, within any suitable predetermined time period, e.g., on the order of seconds, minutes or hours). Exemplary current consumer activity data items may include, but are not limited to, a current location of the consumer, a current motion status of the consumer (e.g., whether the consumer is stationary, exercising, walking, riding a car, riding a train, bicycling, etc.), one or more physiological data of the consumer, and the like.

The current local context data may include information on the context currently surrounding a consumer. Exemplary current local context data items may include, but are not limited to, data on a use status of a mobile computing device of the consumer, an orientation of the mobile computing device, local weather, the time, the date, local merchants, local events, local geographical or map information, and the like.

The predicted consumer activity data may include information on one or more activities that the consumer is likely to perform determined based at least in part on the stored consumer activity data and/or the consumer profile data. Exemplary predicted consumer activity data items may include, but are not limited to, data on a predicted future location of the consumer, data on a predicted future purchase activity of the consumer, and the like.

In step 510, promotion score generation circuitry may assign a promotion score to the promotions determined in step 502. In determining the promotion score for a promotion, the promotion data, the consumer profile data, the stored consumer activity data, and at least one of (i) current consumer activity data, (ii) current local context data, and/or (iii) predicted consumer activity data, may be taken into account.

In step 512, the promotions may be ranked based on their promotion scores.

In step 514, a suitable time period for providing electronic marketing communications containing the promotions may be determined.

Figure 7:
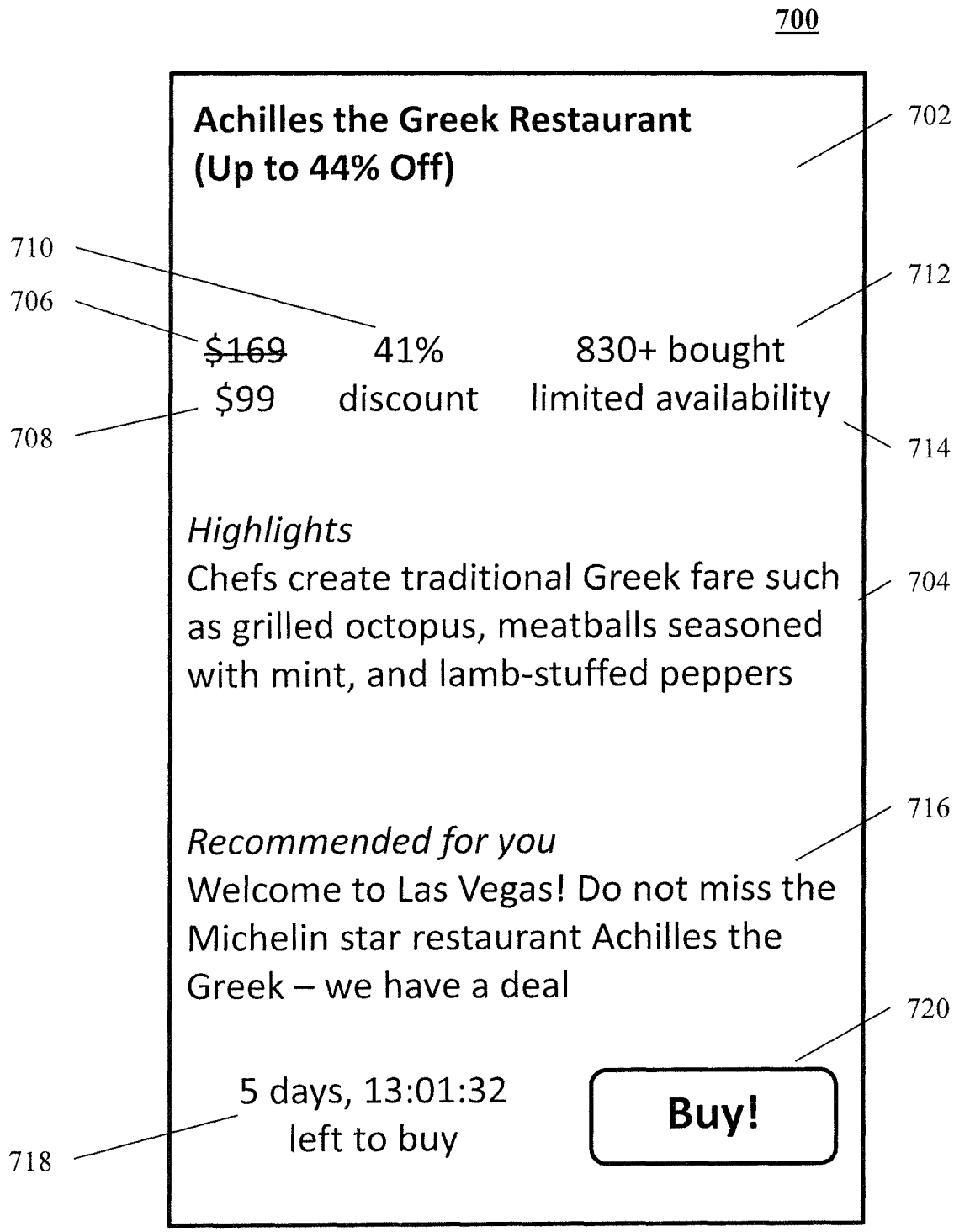
FIG. 7 is a schematic of an exemplary consumer interface associated with a consumer to render an electronic marketing communication comprising a notification of a promotion for viewing and possible purchase by the consumer in accordance with some embodiments.

In step 516, at least one of the ranked promotions may be offered to the consumer during the determined time period by, for example, outputting indications configured to cause electronic marketing communications associated with the promotions to be generated on a consumer interface associated with the consumer. An exemplary electronic marketing communication for a promotion is illustrated in FIG. 7.

In some embodiments, only those promotions whose promotion scores exceed a predetermined threshold value may be offered. In some cases, the predetermined threshold value for the promotion scores may be specific to the category or type of a promotion. In some cases, the predetermined threshold value for the promotion score may be specific to a consumer segment or group. For example, for consumers who use the promotion and marketing service infrequently, the predetermined threshold value may be set to a higher value than for more active consumers.

In some embodiments, only a certain number of promotions with the highest promotion scores may be offered on a given day. The maximum limit may be selected by the consumer. In some cases, the maximum limit may be specific to a consumer segment or group. For example, for consumers who use the promotion and marketing service infrequently, the maximum limit may be set to a lower value than for more active consumers. Certain categories of electronic marketing communications may be exempt from the maximum limit, for example, transactional electronic marketing communications.

In step 518, for a promotion for which an electronic marketing communication is displayed in step 516, a reason may be provided as to why the promotion is particularly recommended for the consumer. The reason may indicate, in some embodiments, one or more data inputs that were used to generate the promotion (e.g., the consumer's current location). An exemplary reason for offering a promotion is illustrated in FIG. 7.

Figure 6:
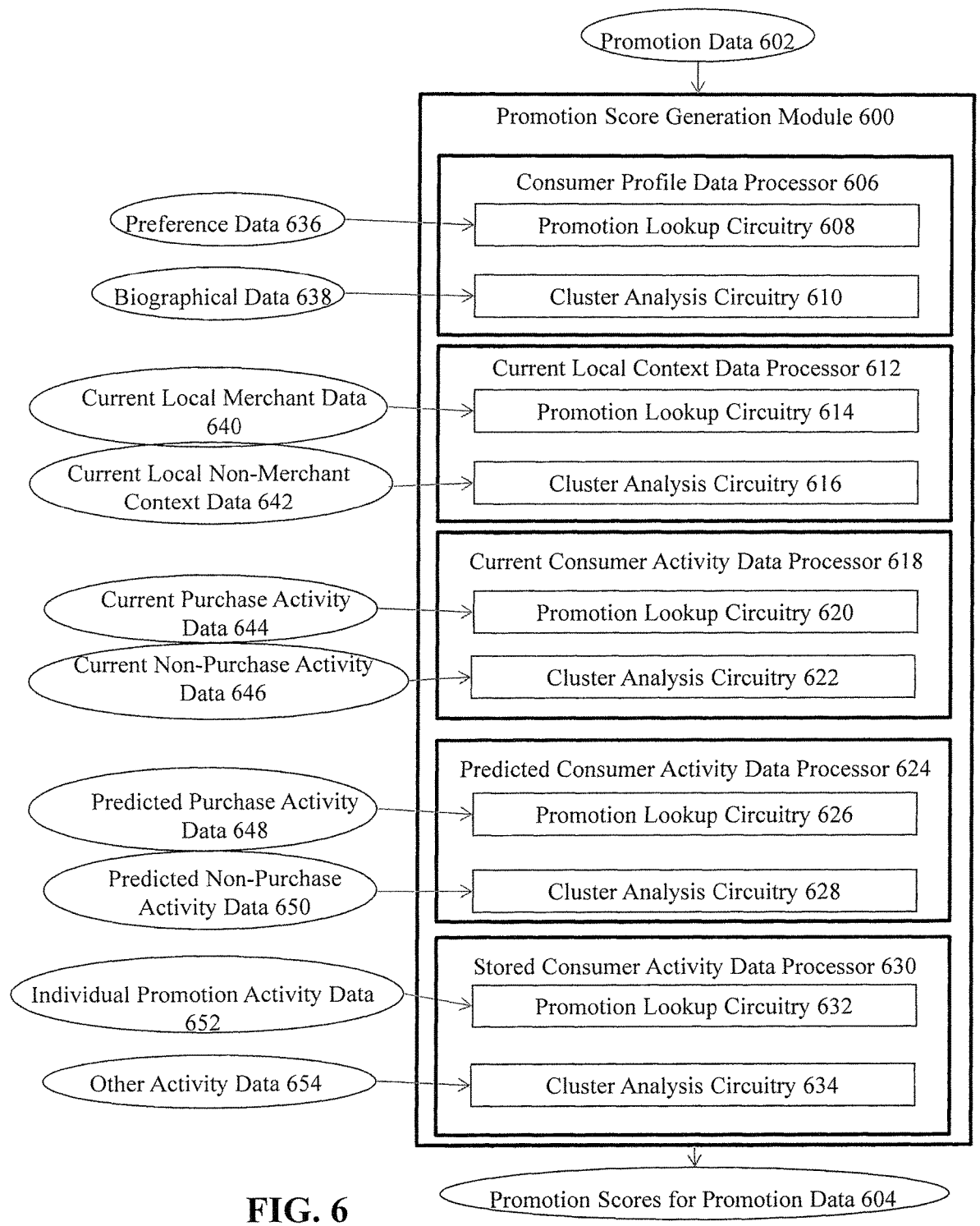
FIG. 6 is a block diagram illustrating exemplary promotion score generation circuitry in accordance with some embodiments.

FIG. 6 is a block diagram illustrating exemplary processing units or devices that may be implemented by promotion score generation circuitry 600 implemented in an electronic marketing communication management service. The promotion score generation circuitry 600 may take as input promotion data 602 and data associated with one or more consumers, and may output promotion scores 604 for at least a subset of the promotions.

An exemplary promotion score generation circuitry 600 may include a single processing unit or a plurality of processing units configured to process and analyze different types of consumer information and to relate the consumer information to the promotion data. The promotion data 602 may be provided as input to each of the processing units. In some embodiments, a score or weight may be assigned to each promotion based on the analysis of each type of input data. The analysis of the input data may be performed by computer-executable instructions that may perform rule-based analysis, statistical analysis, machine learning analysis, and the like. The score or weight assigned to a promotion may indicate or be a measure of how relevant the promotion is to a consumer based on the specific input data used by the processing unit. For example, a first score or weight may be assigned to a promotion based on the analysis of the consumer profile data, a second score or weight may be assigned to the promotion based on the analysis of the current local context data, a third score or weight may be assigned to the promotion based on the analysis of the current consumer activity data, a fourth score or weight may be assigned to the promotion based on the analysis of the predicted consumer activity data, a fifth score or weight may be assigned to the promotion based on the analysis of the stored consumer activity data, and the like. The plurality of scores or weights generated may be combined in any suitable way to generate an overall promotion score for each promotion. Fewer or more scores or weights than those described herein may be used in generating an overall promotion score for a promotion.

In some exemplary embodiments, the promotion score generation circuitry 600 may assign a score to a promotion based partly on promotion data associated with the promotion. For example, if a promotion has very limited availability or if there is a short time deadline for purchasing or redeeming a promotion, then that promotion may be assigned a higher score to indicate an urgency with which the consumer should be notified of the promotion. As another example, transactional electronic marketing communications (i.e., electronic marketing communications generated based on prior consumer interaction with a promotion, such as shipping confirmation electronic marketing communications) may be assigned a higher score than non-transactional electronic marketing communications.

As illustrated in FIG. 6, exemplary promotion score generation circuitry 600 may include a consumer profile data processor 606 configured to process and analyze the consumer profile data with respect to aspects of each promotion. In an exemplary embodiment, consumer preference data 636 included in the consumer profile data (e.g., a locational preference for promotions, a merchant preference for promotions, an instrument preference for promotions, a category and/or sub-category preference for promotions, a price preference for promotions, etc.) may be directly compared to aspects of the promotions using promotion lookup circuitry 608. Consumer preference data 636 includes data that relate directly to aspects of promotions and that can be directly compared to aspects of promotions. For example, if a consumer prefers to purchase promotions from Merchant M, then the promotion lookup circuitry 608 may determine if any of the available promotions originate at Merchant M.

If so, the promotion lookup circuitry 608 may provide a high score to such promotions to indicate that the consumer is likely to purchase these promotions. The promotions not originating at Merchant M may be assigned lower scores or may not be assigned scores in certain embodiments.

In an exemplary embodiment, consumer biographical data 638 included in the consumer profile data (e.g., age, gender, race, ethnicity, height, weight, income, residential address, etc.) may be processed and analyzed in cluster analysis circuitry 610. Consumer biographical data 638 may or may not be directly compared to aspects of promotions. For example, certain promotions may not indicate that they are suitable for a certain age or gender. As such, the cluster analysis circuitry 610 may employ computer-executable instructions configured to process and analyze promotion purchase patterns associated with a plurality of consumers who share one or more common consumer biographical data items with the specific consumer to whom a promotion electronic marketing communication will be provided.

In other words, a plurality of consumers may be defined as a cohort of the specific consumer based on one or more consumer biographical data items, for example, consumers who are in the same age range as the specific consumer, consumers who are the same gender as the specific consumer, consumers who reside in the same geographical area as the specific consumer, and the like. The promotion purchase patterns of this cohort may then be analyzed to determine whether the specific consumer is likely to purchase each of the promotions indicated in the promotion data 602. The implicit notion is that consumers with shared biographical characteristics are likely to have similar interests in promotions and similar purchase patterns. For example, consumers in a teenage cohort are less likely to purchase alcohol and tobacco. The cluster analysis circuitry 610 may implement any suitable technique including, but not limited to, statistical analysis, machine learning, and the like.

As illustrated in FIG. 6, exemplary promotion score generation circuitry 600 may include a current local context data processor 612 configured to process and analyze the current local context data specific to a consumer with respect to aspects of each promotion. In some cases, current local context data may include data on merchants 640 currently in the vicinity of the consumer. This current local merchant data 640 may be generated, for example, by determining a current location of the consumer (e.g., from GPS data received on a mobile computing device of the consumer), and by retrieving data on the merchants at or in the vicinity of the consumer's current location (e.g., using the Internet). The identities of the local merchants can be directly compared to the merchants providing the promotions identified in the promotion data 602. As such, promotion lookup circuitry 614 may take as input the current local merchant data 640 and determine if any of the local merchants are represented in the promotion data 602. If so, the promotion lookup circuitry 614 may provide a high score to such promotions to indicate that the consumer is likely to purchase these local promotions. The promotions not originating at local merchants may be assigned lower scores or may not be assigned scores in certain embodiments.

In an exemplary embodiment, current local context data 642 that do not relate to local merchants (e.g., the time, the date, the geographical terrain, etc.) may or may not be directly compared to aspects of promotions. These data items 642 may be processed and analyzed in cluster analysis circuitry 616. The cluster analysis circuitry 616 may employ computer-executable instructions configured to process and analyze promotion purchase patterns associated with a plurality of consumers who share one or more common current local non-merchant context data items with the specific consumer. In other words, a plurality of consumers may be defined as a cohort of the specific consumer based on one or more local context data items, for example, consumers who purchased promotions at a certain time of the day, consumers who purchased promotions during a certain season, consumers who purchased promotions at or near a certain geographical feature (e.g., a geographical features such as bay or hill that might act as an obstacle blocking consumers from purchasing promotions offered on another side of such bay or hill), and the like. The promotion purchase patterns of this cohort may then be analyzed to determine whether the specific consumer is likely to purchase each of the promotions indicated in the promotion data 602.

The implicit notion is that consumers who are or were in the same or similar local context are likely to have similar interests in promotions and similar purchase patterns. For example, consumers who are situated to the west of a large bay are more likely to purchase promotions that are available only toward the east of the current location. Similarly, consumers who purchase promotions during the winter are more likely to purchase winter clothing and sports equipment. As another example, consumers who purchased promotions at lunchtime are more likely to purchase lunch promotions. As another example, a consumer who travels to a new city may have as a cohort other consumers who traveled to that city, and may receive promotions specific to the new city. The cluster analysis circuitry 616 may implement any suitable technique including, but not limited to, statistical analysis, machine learning, and the like.

As illustrated in FIG. 6, exemplary promotion score generation circuitry 600 may include a current consumer activity data processor 618 configured to process and analyze the activities being currently performed by a consumer with respect to aspects of each promotion. In some cases, current consumer activity data may include data on current purchases of the consumer 644. This current purchase activity data (including merchant data) may be obtained, for example, from business transactions performed via a mobile computing device associated with the consumer. Upon determining that the consumer is purchasing a product or service, promotion lookup circuitry 620 may determine if the merchant seller also has any promotions offered in the promotion data 602. If so, the promotion lookup circuitry 620 may provide a high score to such promotions to indicate that the consumer is likely to purchase the promotions. Otherwise, the promotions may be assigned lower scores or may not be assigned scores in certain embodiments.

In an exemplary embodiment, current consumer activity data that do not relate to purchase activities 646 (e.g., a motion status of the consumer) may or may not be directly compared to aspects of promotions. These data items 646 may be processed and analyzed in a cluster analysis circuitry 622. The cluster analysis circuitry 622 may employ computer-executable instructions configured to process and analyze promotion purchase patterns associated with a plurality of consumers who share one or more common current consumer activity data items with the specific consumer. In other words, a plurality of consumers may be defined as a cohort of the specific consumer based on one or more current activity data items, for example, consumers who purchased promotions while or shortly before or after exercising, consumers who purchased promotions during travel, and the like. The promotion purchase patterns of this cohort may then be analyzed to determine whether the specific consumer is likely to purchase each of the promotions indicated in the promotion data 602. The implicit notion is that consumers who are performing the same or similar activities are likely to have similar interests in promotions and similar purchase patterns. For example, consumers who are exercising may be more likely to purchase water or sports drinks. The cluster analysis circuitry 622 may implement any suitable technique including, but not limited to, statistical analysis, machine learning, and the like.

As illustrated in FIG. 6, exemplary promotion score generation circuitry 600 may include a predicted consumer activity data processor 624 configured to process and analyze the activities predicted to be performed by a consumer with respect to aspects of each promotion. In some cases, predicted consumer activity data may include data on predicted purchases of the consumer 648. Upon determining that the consumer is predicted to purchase a product or service, promotion lookup circuitry 626 may determine if one or more merchants selling that product or service has any promotions offered in the promotion data 602. If so, the promotion lookup circuitry 626 may provide a high score to such promotions to indicate that the consumer is likely to purchase the promotion. Otherwise, the promotions may be assigned lower scores or may not be assigned scores in certain embodiments.

In an exemplary embodiment, predicted consumer activity data that do not relate to purchase activities 650 (e.g., a predicted motion status of the consumer) may or may not be directly compared to aspects of promotions. These data items 650 may be processed and analyzed in cluster analysis circuitry 628. The cluster analysis circuitry 628 may employ computer-executable instructions configured to process and analyze promotion purchase patterns associated with a plurality of consumers who share one or more common consumer activity data items with the predicted consumer activity data of the specific consumer. In other words, a plurality of consumers may be defined as a cohort of the specific consumer based on one or more activity data items. For example, if the specific consumer is predicted to exercise, a corresponding cohort may be formed of consumers who purchased promotions while or shortly before or after exercising. The promotion purchase patterns of this cohort may then be analyzed to determine whether the specific consumer is likely to purchase each of the promotions indicated in the promotion data 602. The cluster analysis circuitry 628 may implement any suitable technique including, but not limited to, statistical analysis, machine learning, and the like.

As illustrated in FIG. 6, exemplary promotion score generation circuitry 600 may include a stored consumer activity data processor 630 configured to process and analyze the activities previously performed by a consumer with respect to aspects of each promotion. In some cases, stored consumer activity data may include stored data on activities performed by the consumer in relation to promotions 652, for example, purchase of promotions, purchase of goods or services, viewing of promotions, rating of promotions, sharing of promotions, and the like. Promotion lookup circuitry 632 may determine if the stored data on activities performed by the consumer in relation to promotions relates to any promotions indicated in the promotion data 602. For example, if the consumer purchased promotions or goods offered by a certain merchant, the promotion lookup circuitry 632 may determine if any of the promotions indicated in the promotion data 602 are offered by the same merchant. If so, the promotion lookup circuitry 632 may provide a high score to such promotions to indicate that the consumer is likely to purchase the promotion. Otherwise, the promotions may be assigned lower scores or may not be assigned scores in certain embodiments. Similarly, if the consumer purchases coffee promotions, then the promotion lookup circuitry 632 may determine if any of the promotions indicated in the promotion data 602 are promotions for coffee purchases. If so, the promotion lookup circuitry 632 may provide a high score to such promotions to indicate that the consumer is likely to purchase the promotion. Otherwise, the promotions may be assigned lower scores or may not be assigned scores in certain embodiments.

In some embodiments, data on activities performed by the consumer in relation to promotions may be processed and analyzed to suppress scores assigned to certain promotions indicated in the promotion data 602. For example, if the consumer previously purchased a promotion for a product that is a durable consumer good (e.g., a car), then it is likely that the consumer will not be interested in additional promotions for the same product type. In this case, promotions for that product type may be assigned lower scores as a suppression mechanism. As another example, if a consumer is determined to take the same geographical route frequently, then the same promotions relevant to that route should not be sent every time the consumer takes that route. As another example, if a consumer is determined to have viewed an electronic marketing communication for a particular promotion, a further electronic marketing communication comprising a notification of the same promotion may not be provided to the consumer.

In an exemplary embodiment, stored consumer activity data that relate to prior activities of a plurality of consumers 654 (which may or may not include activity data on the specific consumer) may be processed and analyzed in cluster analysis circuitry 634. The cluster analysis circuitry 634 may employ computer-executable instructions configured to process and analyze promotion purchase patterns associated with a plurality of consumers who share one or more common prior consumer activity data items with that of the specific consumer. In other words, a plurality of consumers may be defined as a cohort of the specific consumer based on one or more prior activity data items. For example, if the specific consumer regularly exercises, a corresponding cohort may be formed of consumers who exercise as well. The promotion purchase patterns of this cohort may then be analyzed to determine whether the specific consumer is likely to purchase each of the promotions indicated in the promotion data 602. The cluster analysis circuitry 634 may implement any suitable technique including, but not limited to, statistical analysis, machine learning, and the like.

One of ordinary skill in the art will recognize that any combination of two or more of the processing units shown in FIG. 6 may be used to cooperatively generate promotion scores for the promotions.

The cluster analysis circuitry 610, 616, 622, 628 and 634 illustrated in FIG. 6 may implement a statistical analysis technique in certain exemplary embodiments. For example, input data may be fed into a statistical software, such as JMP from SAS, from which the probability of the consumers purchasing each promotion may be outputted. A promotion score that is proportional to the generated probability value may be assigned to each promotion.

The cluster analysis circuitry 610, 616, 622, 628 and 634 illustrated in FIG. 6 may implement a machine learning technique in certain exemplary embodiments.

In an exemplary embodiment, a predictive model may be programmatically generated by analyzing certain aspects or features of each promotion for each consumer that are useful for predicting the probability that the consumer will purchase the promotion. Exemplary promotion features used may include, but are not limited to, geographical proximity to the consumer, price, previous viewing or purchase activity performed by the consumer for the promotion category, and the like. The promotion features may be programmatically retrieved from the historical database 110 in some embodiments. The promotion features may be used to programmatically generate a predictive model for outputting purchase probabilities. The predictive model may be generated using, for example, a learning method like random forests. The generated predictive model may be used to compute, in real-time without any intentional delay, the predicted purchase probability per promotion for each consumer. The promotions may be ranked in descending order of their predicted purchase probabilities. Promotion scores may be determined based on the predicted purchase probabilities.

Figure 8:
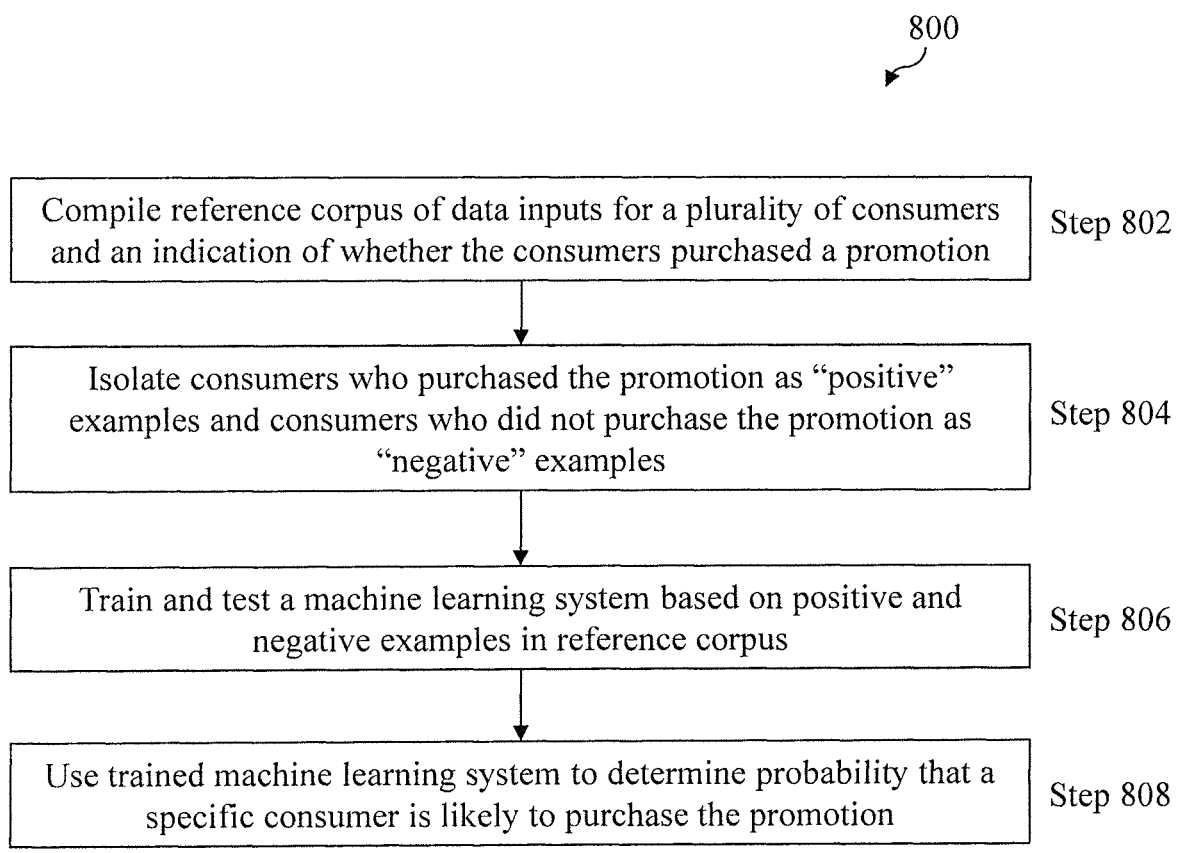
FIG. 8 is a flowchart illustrating an exemplary computer-executable method for training and using a machine learning system in determining a promotion for which an electronic marketing communication should be provided to a consumer in accordance with some embodiments.

FIG. 8 is a flowchart illustrating an exemplary computer-executable method 800 for training and using a machine learning system in determining a promotion score for a promotion based on certain data inputs. The promotion score thus generated may subsequently be used in combination with other promotion scores to generate an overall promotion score for the promotion for a consumer. In step 802, a reference corpus may be compiled, including data inputs for a plurality of consumers and an indication of whether the consumers purchased a promotion. In step 804, consumers who purchased the promotion may be identified as "positive" examples and consumers who did not purchase the promotion may be identified as "negative" examples. In step 806, the positive and negative examples in the reference corpus may be used to train and test a machine learning module or system. In step 808, the trained machine learning module or system may be used to determine a probability value that a specific consumer is likely to purchase the promotion based on the data inputs of the specific consumer.

Figure 9:
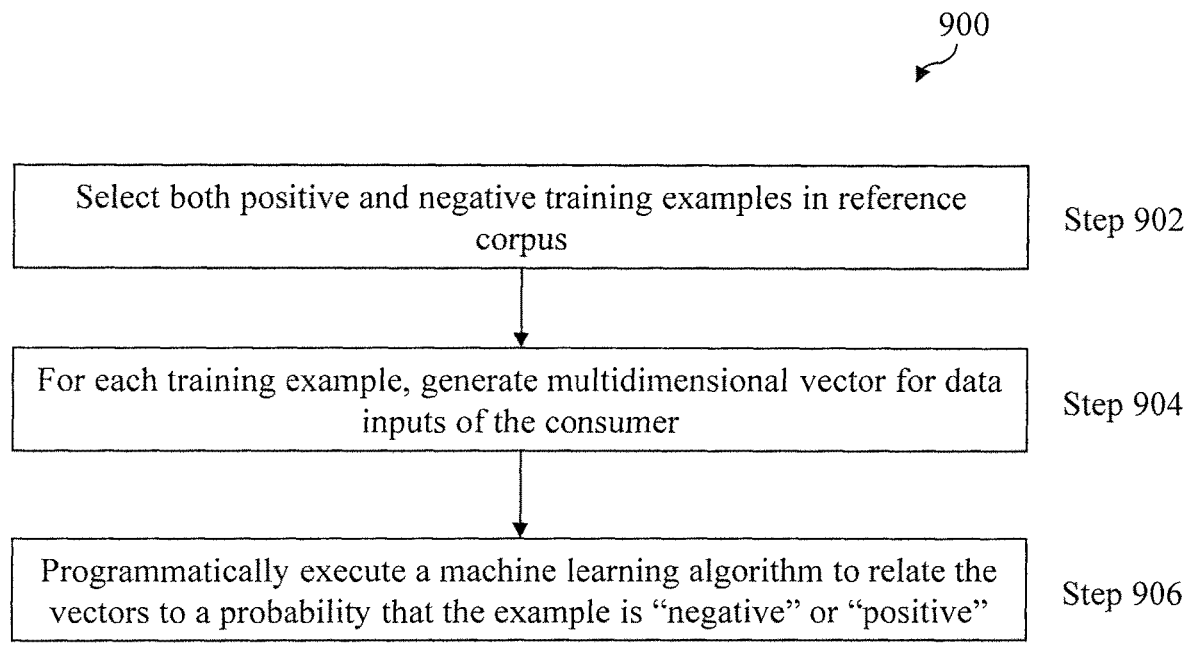
FIG. 9 is a flowchart illustrating an exemplary computer-executable method for training the machine learning system referenced in FIG. 8 in accordance with some embodiments.

FIG. 9 is a flowchart illustrating an exemplary computer-executable method 900 for training the machine learning system referenced in FIG. 8. In step 902, both positive and negative training examples may be selected in the reference corpus, the remaining examples to be used as testing examples. In step 904, for each training example, a multi-dimensional vector may be generated using the data inputs corresponding to the example consumer. The multidimensional vector may be rendered in a space visualized based on the different data elements in the data inputs. In step 906, the machine learning algorithm may be programmatically executed to relate the vectors of the training examples to probability values that the training examples are "positive" or "negative" examples.

Figure 10:
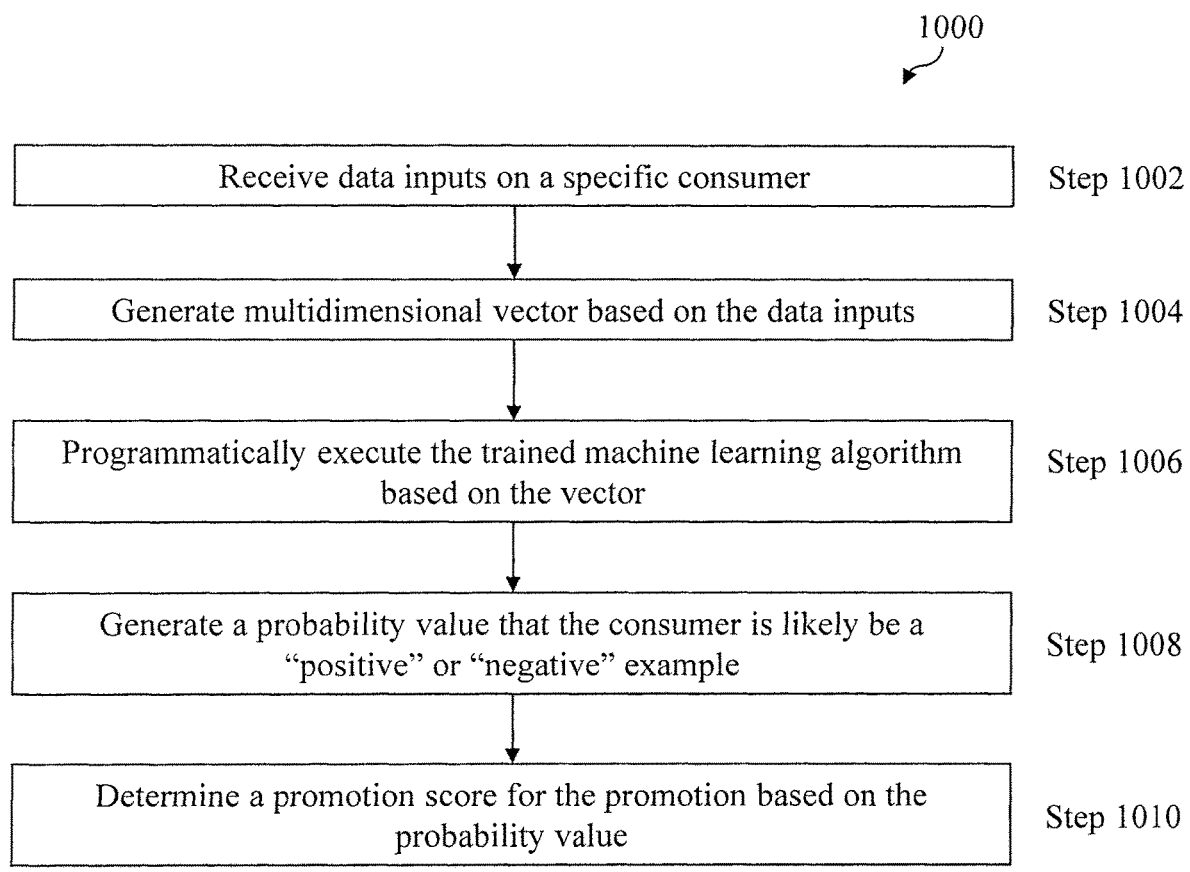
FIG. 10 is a flowchart illustrating an exemplary computer-executable method for using a trained machine learning system in determining a promotion score for a promotion in accordance with some embodiments.

FIG. 10 is a flowchart illustrating an exemplary computer-executable method 1000 for using a trained machine learning system in determining a promotion score of a promotion to indicate how likely it is that a specific consumer will purchase the promotion, based on a set of data inputs. In step 1002, the data inputs for the specific consumer may be received, for example, from the historical database 110. In step 1004, a multidimensional vector may be generated using the data inputs of the specific consumer in a space visualized based on the different data elements. In step 1006, the trained machine learning algorithm in the machine learning module may be programmatically executed based on the vector. In step 1008, the machine learning algorithm may generate a probability value indicating whether the vector indicates that the consumer is likely to be a "positive" or "negative" example. In step 1010, a promotion score may be determined based on the probability value. The promotion score may be proportional to the probability value in some embodiments.

In some embodiments, the cluster analysis circuitry 634 used in the stored consumer activity data processor 630 illustrated in FIG. 6 may use a social graph and/or a taste graph.

A social graph is a digital representation of social network connections and/or promotion sharing activities connecting a plurality of consumers. In a social graph, each consumer is represented as a node, and promotion sharing activities between two consumers is represented as an edge or connection path connecting the nodes representing the consumers. In some embodiments, a social graph generator and processor circuitry may use data in the historical database 110 to generate a social graph. A connection score representing a frequency and/or volume of promotion sharing activities performed between two consumers is associated with each edge in the social graph. Exemplary connection scores may be determined based on any suitable formula. In one embodiment, a connection score may be the sum of the promotion sharing activities performed between two consumers. In another embodiment, a connection score may be the weighted sum of the promotion sharing activities performed between two consumers. In this case, promotion sharing activities that resulted in purchase of the shared promotions may have a higher weight than promotion sharing activities that did not result in purchase or viewing of the shared promotions. Similarly, promotion sharing activities that resulted in viewing of the shared promotions may have a higher weight than promotion sharing activities that did not result in purchase or viewing of the shared promotions.

In certain embodiments, a single edge (and associated connection score) may be provided for all promotion sharing activities associated with two consumers. In certain other embodiments, a plurality of edges (and a plurality of associated connection scores) may be provided for promotion sharing activities associated with two consumers. In this case, each edge connecting the same two nodes may be associated with a particular category or characteristic of promotions shared between the two consumers.

Figure 11:
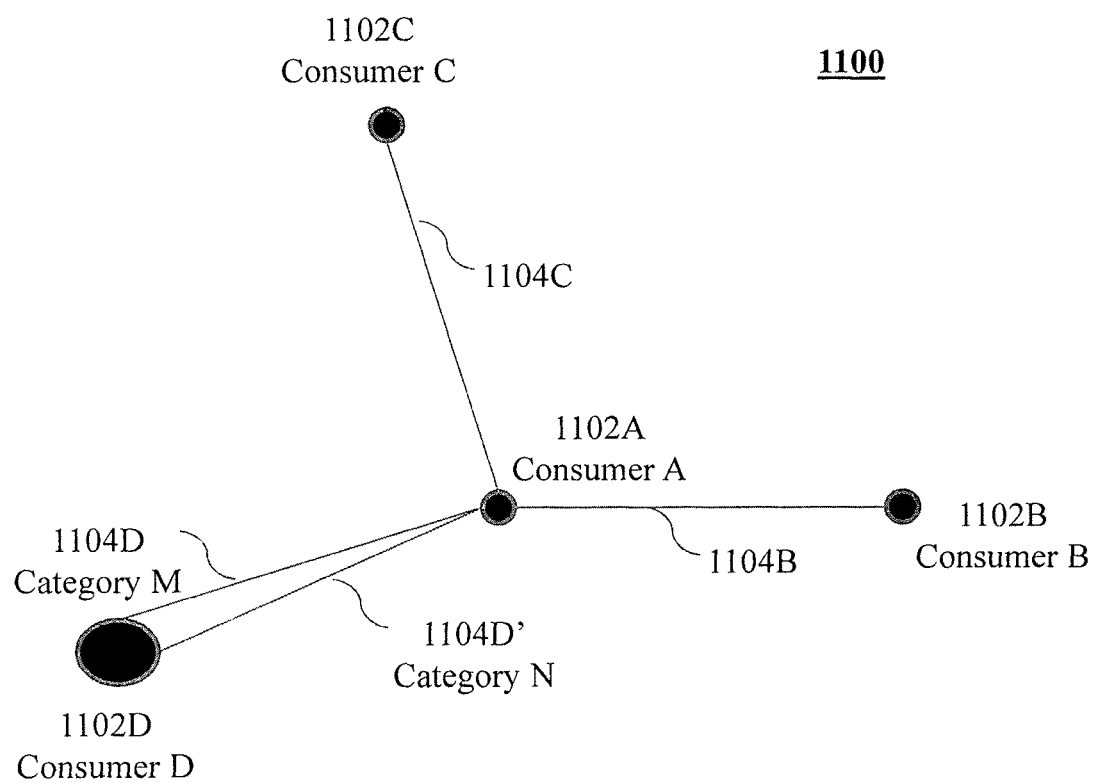
FIG. 11 is a schematic of an exemplary partial social graph connecting a plurality of consumers using a promotion and marketing service in accordance with some embodiments.

FIG. 11 is a schematic illustrating an exemplary partial social graph 1100 connecting a plurality of consumers A-D who use a promotion and marketing service. Social graph 1100 includes nodes 1102A, 1102B, 1102C and 1102D representing consumers A, B, C and D, respectively. Edge 1104B connecting nodes 1102A and 1102B represent promotion sharing activities associated with consumers A and B. Edge 1104C connecting nodes 1102A and 1102C represent promotion sharing activities associated with consumers A and C. Edges 1104D and 1104D' connecting nodes 1102A and 1102D represent promotion sharing activities associated with consumers A and D. Edge 1104D is associated with a first category M of the promotions shared between consumers A and D. Edge 1104D' is associated with a second category N of the promotions shared between consumers A and D.

Figure 12:
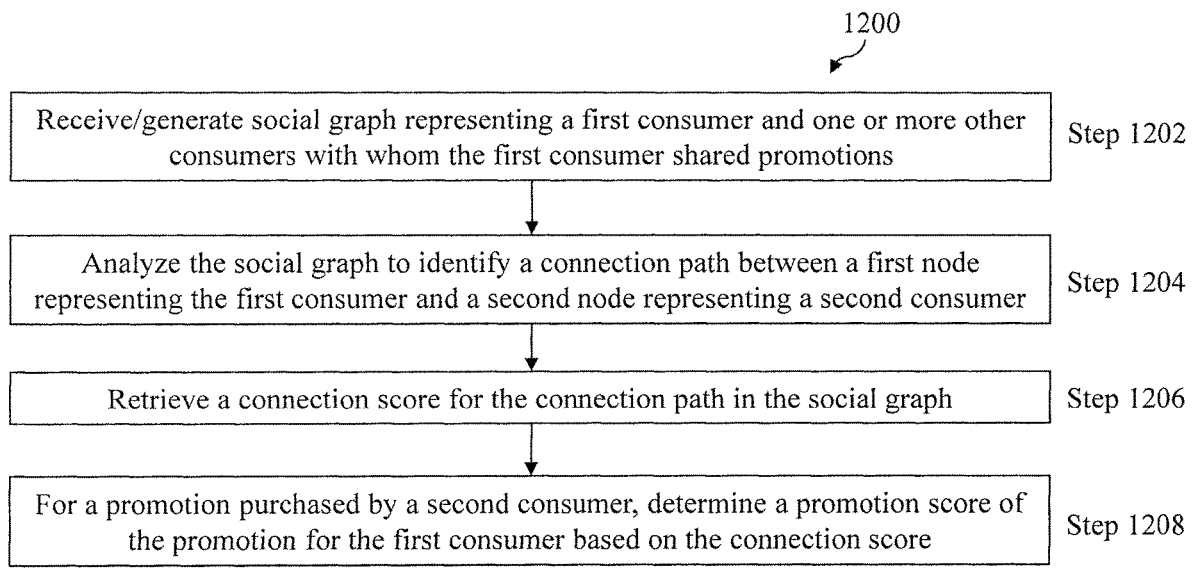
FIG. 12 is a flowchart illustrating an exemplary computer-executable method for using a social graph to generate a promotion score for a promotion in accordance with some embodiments.

FIG. 12 is a flowchart illustrating an exemplary computer-executable method 1200 for using a social graph in determining a promotion suitable for a first consumer. In step 1202, a digital representation of a social graph may be received, for example, from storage on a memory or a computer-readable medium. Alternatively, a digital representation of the social graph may be generated using prior promotion sharing activities performed by consumers. The social graph may be a complete social graph of all consumers who use the promotion and marketing service, or a partial graph representing the promotion sharing activities of a first consumer.

In step 1204, the social graph may be analyzed to identify an edge between a first node representing the first consumer and a second node representing a second consumer.

In step 1206, a connection score associated with the edge may be retrieved from the social graph.

In step 1208, for a promotion purchased by a second consumer, a promotion score may be generated for the first consumer based on the connection score. In one embodiment, the promotion score may be set to the connection score. In other embodiments, the promotion score may account for the connection score and one or more other factors, for example, similarities in profile data of the first and second consumers (e.g., whether the consumers fall in the same age category, whether the consumers are of the same gender, whether the consumers reside in the same geographical area).

Steps 1204-1208 illustrated in FIG. 12 may be repeated for different "second" consumers to identify a plurality of promotions that may be considered for recommendation to the first consumer. In this manner, historical data associated with a plurality of consumers may be aggregated and used to identify promotions of most relevance to the first consumer.

A taste graph is a digital representation of commonalities in promotion interests among a plurality of consumers. In some embodiments, a taste graph generator and processor circuitry may use data in the historical database 110 to generate a taste graph. In a taste graph, each consumer is represented as a node, and similarities in promotions purchased (or viewed or rated or favorited) by two consumers are represented as an edge or path connecting the nodes representing the consumers. Two or more promotions may be similar in price, geographical location of the merchant, category, sub-category, and the like. A path relevancy score representing the extent of similarities between the promotions purchased by two consumers is associated with each edge in the taste graph. In certain embodiments, a single edge (and associated relevancy score) may be provided for all promotions purchased by two consumers. In certain other embodiments, a plurality of edges (and a plurality of associated relevancy scores) may be provided for promotions purchased by two consumers. In this case, each edge connecting the same two nodes may be associated with a particular category of promotions purchased by the two consumers.

Although it should be appreciated that the social graph and the taste graph may be constructed internally to the promotion and marketing service using data internal to the promotion and marketing service, some embodiments may leverage external data to provide this functionality. For example, the social graph and the taste graph may be received from or constructed from data received from a social networking service or website. Such data may include preference data (e.g., "likes"), contact lists or "friend" lists, posts or data posted by the user or the user's connections on the social networking website, event data posted on the social networking website, guestbook information, or any other data obtainable via accessing a social network website. In some embodiments, the social network website may provide such data via an application programming interface. Consumers may be incentivized to allow access to such data, such as by providing additional discounts, offers of exclusive promotions, or other rewards and incentives. Some embodiments may use information from social networking websites to access other external data sources, social network websites, and the like. For example, given an email address, embodiments may determine if there is a Twitter® account associated with the same address, and access public data associated with that account. Some embodiments may also access contact data form the user's mobile device. Yet further embodiments may detect when the consumer is out with a friend, such as by identifying the consumer's friends from the social graph, identifying the location of those friends through local context data associated with the friend's mobile device, and verifying that the friend and the consumer are proximate to one another. Some embodiments may utilize a social graph to determine the identity of the consumer's spouse, romantic partner, or the like, and preferences for the spouse or romantic partner to be used in determining the preferences of the couple for sending of electronic marketing communications.

Figure 13:
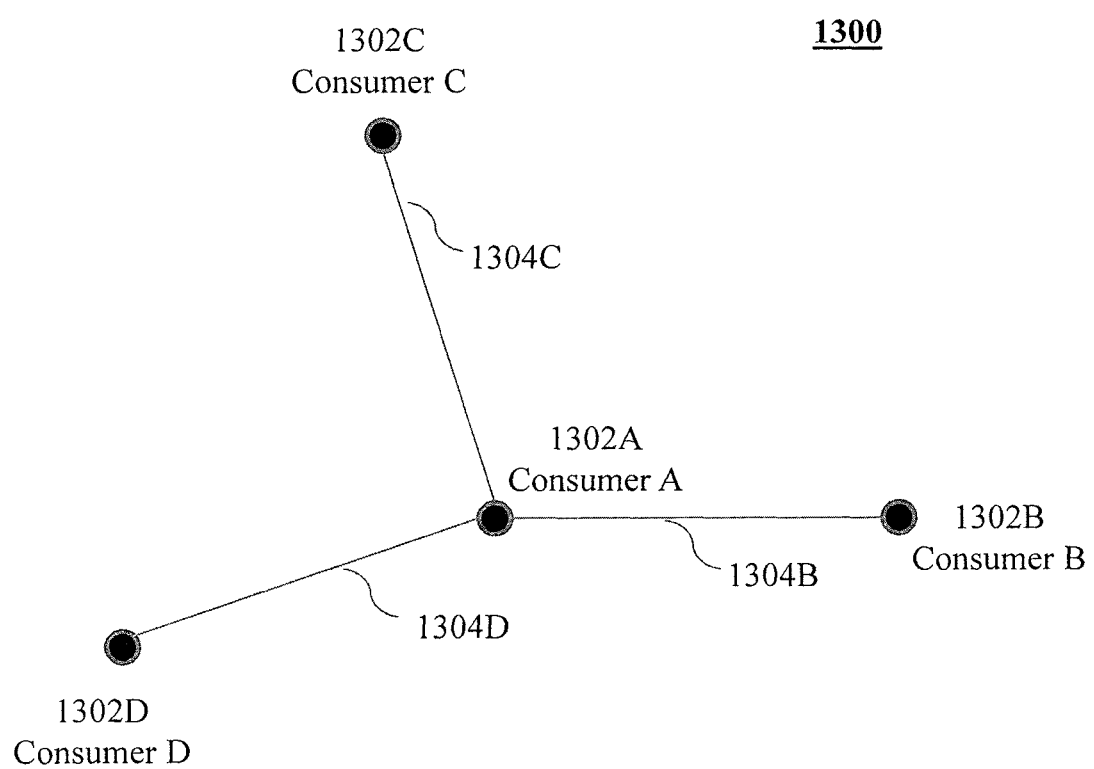
FIG. 13 is a schematic illustrating an exemplary partial taste graph connecting a plurality of consumers using a promotion and marketing service in accordance with some embodiments.

FIG. 13 is a schematic illustrating an exemplary partial taste graph 1300 connecting a plurality of consumers A-D who use a promotion and marketing service. Taste graph 1300 includes nodes 1302A, 1302B, 1302C and 1302D representing consumers A, B, C and D, respectively. Edge 1304B connecting nodes 1302A and 1302B represent similarities between promotions purchased by both consumers A and B. Edge 1304C connecting nodes 1302A and 1302C represent similarities between promotions purchased by both consumers A and C. Edge 1304D connecting nodes 1302A and 1302D represent similarities between promotions purchased by both consumers A and D.

Figure 14:
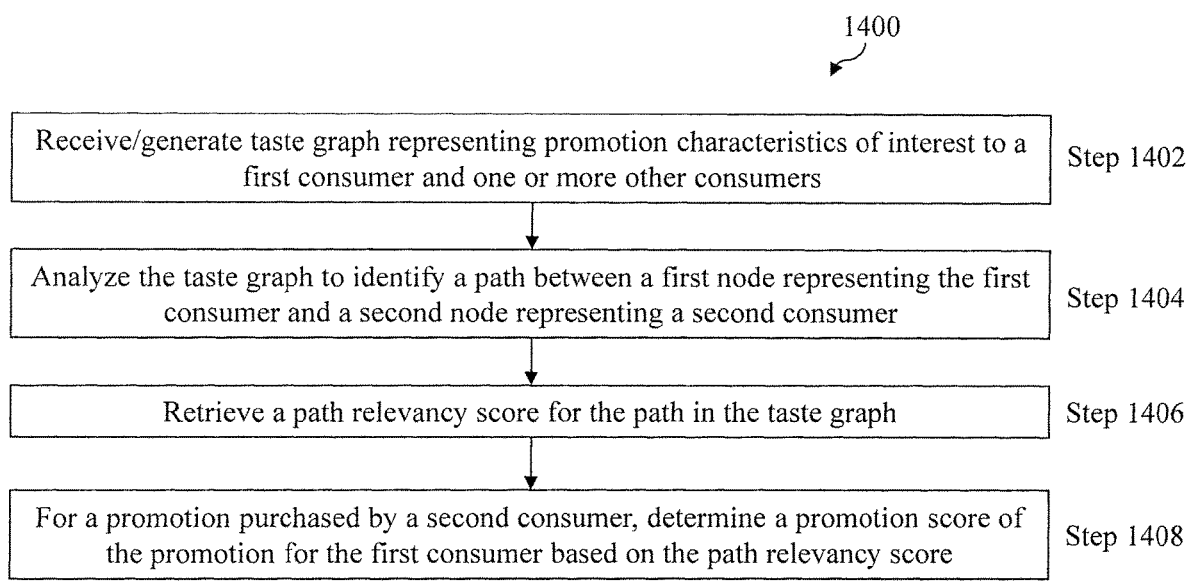
FIG. 14 is a flowchart illustrating an exemplary computer-executable method for using a taste graph to generate a promotion score for a promotion in accordance with some embodiments.

FIG. 14 is a flowchart illustrating an exemplary computer-executable method 1400 for using a taste graph in determining a promotion suitable for a first consumer. In step 1402, a digital representation of a taste graph may be received, for example, from storage on a memory or a computer-readable medium. Alternatively, a digital representation of the taste graph may be generated using stored consumer activity data, for example, data on promotion purchases and/or promotion ratings performed by consumers. The taste graph may be a complete taste graph of all consumers who use the promotion and marketing service, or a partial graph representing stored consumer activity data of a first consumer and how similar the corresponding promotions are to those purchased and/or rated by other consumers.

In step 1404, the taste graph may be analyzed to identify an edge between a first node representing the first consumer and a second node representing a second consumer.

In step 1406, a path relevancy score associated with the edge may be retrieved from the taste graph.

In step 1408, for a promotion purchased by a second consumer, a promotion score may be generated for the first consumer based on the path relevancy score. In one embodiment, the promotion score may be set to the path relevancy score. In other embodiments, the promotion score may account for the path relevancy score and one or more other factors, for example, similarities in profile data of the first and second consumers (e.g., whether the consumers fall in the same age category, whether the consumers are of the same gender, whether the consumers reside in the same geographical area).

Steps 1404-1408 illustrated in FIG. 14 may be repeated for different "second" consumers to identify a plurality of promotions that may be considered for recommendation to the first consumer. In this manner, historical data associated with a plurality of consumers may be aggregated and used to identify promotions of most relevance to the first consumer.

Figure 15:
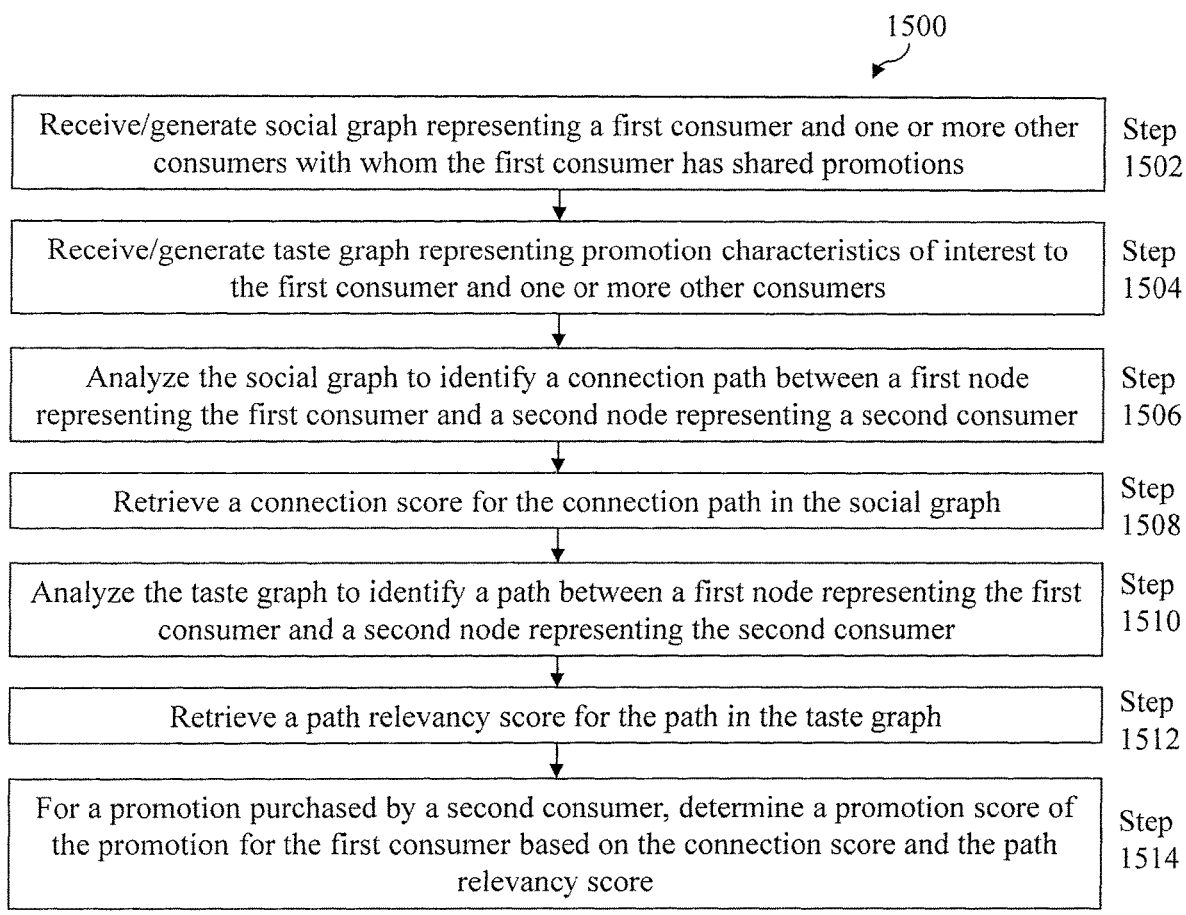
FIG. 15 is a flowchart illustrating an exemplary computer-executable method for using a social graph and a taste graph to generate a promotion score for a promotion in accordance with some embodiments.

FIG. 15 is a flowchart illustrating an exemplary computer-executable method 1500 for using a social graph and a taste graph in determining a promotion suitable for a first consumer. In step 1502, a digital representation of a social graph may be received or generated. In step 1504, a digital representation of a taste graph may be received or generated. In step 1506, the social graph may be analyzed to identify an edge between a first node representing the first consumer and a second node representing a second consumer. In step 1508, a connection score associated with the edge may be retrieved from the social graph. In step 1510, the taste graph may be analyzed to identify an edge between a first node representing the first consumer and a second node representing the same second consumer referenced in step 1508. In step 1512, a path relevancy score associated with the edge may be retrieved from the taste graph.

In step 1514, for a promotion purchased by a second consumer, a promotion score may be generated for the first consumer based on a suitable combination of the connection score and the path relevancy score.

Steps 1506-1514 illustrated in FIG. 15 may be repeated for different "second" consumers to identify a plurality of promotions that may be considered for recommendation to the first consumer. In this manner, historical data associated with a plurality of consumers may be aggregated and used to identify promotions of most relevance to the first consumer.

Certain exemplary embodiments may be configured to rank promotions selected for recommendation to consumers based on predictions of promotion performance and consumer behavior. In some embodiments, for example, a set of consumer lifecycle model states that each respectively represents a mobile application ("app," hereinafter) consumer's current level of engagement and/or activation while interacting with the mobile app may include one or more factors that define the context from which a request for promotions that are most relevant to consumer was received. Each of the lifecycle model states is associated with a ranking function based on a ranking target that is determined, based on an analysis of historical consumer behavior and the current context from which the request for promotions was made, to increase the consumer's engagement and/or activation level. A ranking algorithm having a ranking target associated with the consumer's assigned lifecycle model state is selected, and each of a set of promotions that has been selected for recommendation to the consumer through the app is assigned a predicted relevance value by the selected ranking function. The predicted relevance value represents the probability that the consumer's behavior with respect to the promotion will approach the target while the consumer interacts with the app. In some embodiments, the set of promotions selected for recommendation can be sorted and/or ranked based on their respective associated predicted relevance values. The top-ranked promotions may be featured in a presentation to the consumer. Details on ranking of promotions based on the contextual relevance of different data inputs are provided in attached co-assigned U.S. patent application Ser. No. 14/231,222, filed on Mar. 31, 2014, titled "Predictive Recommendation System Using Contextual Relevance," the entire contents of which are hereby incorporated by reference.

IV. PROGRAMMATIC GENERATION OF EXEMPLARY INPUT DATA

In certain embodiments, the input data depicted in FIG. 6 may be available in one or more databases and may be programmatically retrieved from the databases for use in generating promotion scores for promotions. In certain other embodiments, one or more input data items may be automatically determined or generated.

In one example of current local context data, information on local merchants, geographical terrain and geographical obstacles may be determined by searching a map provided on the Internet using the consumer's current geographical location as a center of the map.

In another example of current local context data, data on a use status of a mobile computing device of the consumer may be obtained directly from the mobile computing device. In another example of current local context data, data on an orientation of the mobile computing device may be obtained from a gyroscope or other orientation determining device provided in the device. In other examples, data on the environment surrounding the mobile computing device (e.g., light conditions, noise conditions) may be obtained using a light sensor, a camera, a video camera, a microphone, other mobile computing device sensor data, and the like.

In an example of current consumer activity data, physiological data may be obtained from a physiological sensor worn by the consumer and/or a physiological data server that obtains data from such a sensor. Exemplary physiological data may include, but is not limited to, blood pressure, heart rate, a measure of sweating, temperature, and the like.

In another example, current consumer activity data may include data on a motion status of the consumer. Exemplary motion status may include, but is not limited to, sleeping, resting, walking, exercising, riding in or driving a car, riding a train, riding a plane, and the like. In certain embodiments, a motion status may be determined based on physiological data, for example, a reduced body temperature may indicate that the consumer is sleeping, while an elevated heart rate may indicate that the consumer is exercising. In certain embodiments, a motion status may be determined based on location data of the consumer, which may be inferred based on a location of the mobile computing device. In some embodiments, location data may be generated by the mobile computing device based on global position system (GPS) calculations, cellular tower triangulation, WiFi access point identification, and the like.

If the location of the consumer (or a mobile computing device associated with the consumer) remains the same over time, it may be determined that the consumer is not moving. If the locations of the consumer indicate that the consumer is moving at a high and relatively constant speed, this may indicate that the consumer is riding a train or a plane. If the locations of the consumer indicate that the consumer is moving at a high speed that varies frequently, this may indicate that the consumer is driving or riding in a car. Similarly, locations indicating lower speeds may indicate that the consumer is walking, running or cycling. In certain embodiments, a motion status may be determined based on a motion sensor on the consumer's body, for example, an accelerometer, a gyroscope, etc.

In another example, predicted consumer activity data may be automatically generated based on stored consumer activity data, i.e., data on prior activities performed by the consumer. For example, if the consumer purchases coffee every morning over a minimum number of days, the consumer may be predicted to purchase coffee on the next day as well. Any suitable technique may be used to generate a predictive model of future activities performed by the consumer. One exemplary technique may employ a machine learning algorithm that relates past activity to future activities of the same type.

V. EXEMPLARY INFORMATION PROVIDED IN ELECTRONIC MARKETING COMMUNICATIONS

Exemplary embodiments may provide succinct and relevant information regarding each promotion in the electronic marketing communication notifying the consumer of the promotion. The promotion information may be caused to be rendered on an electronic marketing communication notifying the consumer of the promotion that is displayed on a consumer interface. The promotion information may include, in some embodiments, a reason for notifying the consumer of the promotion. The reason may be based on one or more data inputs that were used to determine that the consumer should be notified of that particular promotion (for example, as shown in the exemplary method of FIG. 5).

FIG. 7 is a schematic of an exemplary consumer interface 700 associated with a consumer on which an electronic marketing communication comprising a notification of a promotion may be caused to be generated. Exemplary consumer interface 700 provides an electronic marketing communication for a restaurant promotion in Las Vegas. The electronic marketing communication may include introductory information 702 and detailed information 704 on the promotion, e.g., the subject matter of the promotion and the discount. The electronic marketing communication may also include the original price 706, the discounted price 708, the discount percentage 710, the number of consumers who purchased the promotion 712, and whether there is limited availability 714. The electronic marketing communication may also include a time deadline 718 for purchasing the promotion and a user input tool 720 (e.g., a "buy" button) for enabling the consumer to purchase the promotion.

The electronic marketing communication may also display a reason 716 for which the promotion is particularly recommended for the consumer. Even though the consumer may not be a Nevada resident, exemplary embodiments may determine, based on GPS data associated with a mobile computing device of the consumer, that the consumer has traveled to Las Vegas, Nev. That is, the current consumer activity data may indicate that the current location of the consumer is Las Vegas, Nev. Based partly on this information, the exemplary method of FIG. 5 may determine that the consumer should be welcomed to the city with a restaurant promotion in Las Vegas. In this case, the reason 716 for offering this promotion may indicate that the promotion is being offered because the consumer traveled to Las Vegas ("Welcome to Las Vegas!").

Exemplary reasons for offering certain promotions may include, but are not limited to:
  Domestic travel by the consumer (e.g., "Welcome to Las Vegas! Do not miss the Michelin star restaurant Achilles the Greek—we have a deal")
  Foreign travel by the consumer (e.g., "Welcome to Paris! Baguettes, macaroons and Eiffel Tower tours up to 50% off")
  That the promotion is a daily deal special (e.g., "Daily deal—$22.99 for an Escali Digital Glass Kitchen Scale")
  The consumer's current location and/or the current time (e.g., "Hungry? A five-star sushi place we think you like is just 0.2 miles away . . . and we have a deal")
  The current season (e.g., "Have you checked out our Back to School promotions yet? They are selling out fast!", "It's hot! Buy some ice cream at The Dairy Queen—50% off")
  That the promotion is in a virtual shopping cart that was abandoned by the consumer and is likely to sell out; an estimated sell-out time may be provided in some cases (e.g., "Hurry up! A deal you were interested in is going to sell out today")
  That the promotion was favorited by the consumer (e.g., "One of your favorite promotions is selling out—Half off tasting tour at Alegio Chocolate—Only 10 left")
  That the merchant offering the promotion was favorited by the consumer (e.g., "One of your favorite deals is back! 50% off a spa treatment at Zen Garden Nail Spa")
  A category or sub-category of the promotion (e.g., "Foodies like you loved the Ruben sandwich deal at Mogg & Meltzer")
  That the promotion was purchased by another consumer socially linked to the consumer (e.g., "Your friend Joe Smith is going skydiving at Skydive Holister—Get 50% off and join him")
  Events indicated on the consumer's calendar (e.g., "Five of your friends have birthdays this week. Buy them a gift")
  A price alert (e.g., "This promotion price dropped to only $10!")
  A new merchant alert (e.g., "Yay! A new Foodie restaurant 0.2 miles from home—promotions for "The Purple Pig" are now available. Book your discounted reservation for tonight or this weekend")
  An alternative merchant alert upon closure of a merchant from whom the consumer purchased goods and services in the past (e.g., "Your old haunt the Nut Factory has closed. Check out the Mad House only 0.3 miles away—20% off")

Once a consumer performs a transaction using the promotion and marketing service (e.g., purchase of a promotion), one or more transactional electronic marketing communications associated with the corresponding promotions may be caused to be generated on the consumer interface. These electronic marketing communications may include a reason for their display including, but not limited to:
  Promotion expiration reminder (e.g., "Your promotion at Cleopatra's spa is expiring in two days!")
  Post promotion expiration reminder (e.g., "Your promotion at Nero fireworks has expired. Here is a gift card for $5 that you paid in")
  Shipping confirmation (e.g., "Your Nikon camera has shipped")
  Delivery confirmation (e.g., "Your Nikon camera has been delivered")
  Promotion redemption reminder (e.g., "Looks like you are near Starbucks—ready to redeem your promotion?")
  Post-redemption survey (e.g., "How was your experience at Brutus restaurant?")

One or more electronic marketing communications for promotions may be caused to be generated at certain periods in the lifecycle of a consumer on the promotion and marketing service. A consumer's lifecycle may be divided into any desired segments or time periods, for example, activation period during which a new consumer becomes active on the promotion and marketing service, a retention risk period during which a consumer is likely to drop out of the promotion and marketing service, a re-activation period when a previously inactive consumer becomes active again, a reward period (for example, after a consumer complains about the promotion and marketing service), and the like. These electronic marketing communications may include a reason for their display including, but not limited to:

Activation period (e.g., "Welcome! Get $5 off your first purchase within the next 48 hours")

Retention risk period (e.g., "We haven't seen you in a while! Get $5 off your first purchase within the next 48 hours")

Re-activation period (e.g., "We miss you! Get $5 off your first purchase within the next 48 hours")

Reward period (e.g., "Hope we resolved your issues in your last support call. Here is $5 off from your next purchase")

VI. EXEMPLARY TIMING RULES FOR PROVIDING ELECTRONIC MARKETING COMMUNICATIONS

Exemplary embodiments provide computer systems, computer-executable methods and one or more non-transitory computer-readable media for providing electronic marketing communications for promotions to consumer interfaces during automatically selected time periods that are deemed appropriate for a consumer. The ability to recommend promotions for purchase at appropriate times is important in a promotion and marketing service as it increases the likelihood that the consumer will view and consider purchasing the promotion. This capability avoids a scenario in which a consumer ignores a promotion because an electronic marketing communication for the promotion was provided at a time when the consumer was unlikely to be interested in its purchase, or at a time when the consumer was likely to be engaged in other endeavors. Thus, the ability to determine appropriate time periods for providing electronic marketing communications helps maintain an active and engaged customer base and maximize profits for the service.

Certain exemplary embodiments provide rule-based technical solutions for determining when to provide electronic marketing communications for promotions. In some cases, the rules may vary based on the type of the electronic marketing communication, for example, an electronic marketing communication offering a promotion, a transactional electronic marketing communication after the consumer has already interacted with a promotion, and the like. Certain exemplary timing rules may take into account one or more of the following: consumer profile data, stored consumer activity data, current consumer activity data, current local context data, and/or predicted consumer activity data.

In some exemplary embodiments, a predictive model may be programmatically generated to determine a suitable time for offering promotions. The predictive model may be generated by analyzing certain aspects or features of each promotion for each consumer that are useful for predicting the probability that the consumer will purchase the promotion. Exemplary promotion features used may include, but are not limited to, geographical proximity to the consumer, price, previous viewing or purchase activity performed by the consumer for the promotion category, and the like. The promotion features may be programmatically retrieved from the historical database 110 in some embodiments. The promotion features may be used to programmatically generate a predictive model for outputting purchase probabilities. The predictive model may be generated using, for example, a learning method like random forests. The generated predictive model may be used to compute, in real-time without any intentional delay, the predicted purchase probability per promotion for each consumer. If the predicted purchase probability for a promotion exceeds a threshold value, then an electronic marketing communication for the promotion may be sent to the consumer without delay.

An exemplary timing rule may trigger an electronic marketing communication for a promotion based on a feature of a promotion (e.g., type of promotion, time of offer of promotion, weather at time of offer of promotion) and one or more features associated with a consumer (e.g., location, proximity to a promotion, current time, current season, price preference). For example, if the current day is Friday and the weather for a coastal town near a consumer is sunny and warm, then a promotion for a restaurant or beach-related activity in the coastal town may be offered to the consumer.

An exemplary timing rule may indicate one or more time periods during which all electronic marketing communications should be provided for a consumer, for example, once in the morning and once in the evening. Another exemplary timing rule may indicate one or more time periods during which no electronic marketing communications should be provided, for example, from 11 pm to 8 am local time during which the consumer is likely to be asleep.

An exemplary timing rule may specify how long an electronic marketing communication is to be retained in the consumer interface. The retention time may be the same for all electronic marketing communications or may vary based on the promotion. For example, the retention time for a promotion may be proportional to a promotion score of the promotion.

An exemplary timing rule may specify a time period for providing an electronic marketing communication based on the availability of a promotion. For example, for a promotion with a very limited availability (i.e., close to selling out), an electronic marketing communication may be provided as soon as possible. Otherwise, one of the other timing rules may be followed for a promotion with unlimited or less limited availability.

An exemplary timing rule may specify a time period for providing an electronic marketing communication based on an actionability of a promotion. For example, if there is a limited time period during which a promotion may be purchased, then an electronic marketing communication may be sent as soon as possible. Otherwise, one of the other timing rules may be followed for a promotion with unlimited or less limited availability.

An exemplary timing rule may specify a time period for providing an electronic marketing communication based on the "freshness" of a promotion. In some embodiments, the "freshness" of a promotion may be determined based on an impact score, an interest score, an exploration score, and/or combinations thereof. The impact score may indicate a programmatically determined likelihood that electronic marketing communications for the promotion that have been provided to the consumer will generate a (e.g., future) purchase. The interest score may indicate a programmatically determined likelihood of consumer interest in the promotion based on consumer interaction with electronic marketing communications for the promotion that have been provided to the consumer. The exploration score may indicate the relevance of a promotion based on consumer preference data (e.g., profile data, purchase history data, etc.). In various embodiments, one or more of the impact score, interest score and exploration score may be used to determine the promotion score of a promotion. In some embodiments, promotional server 104 may be configured to determine the promotion score (e.g., impact score and/or exploration score) based on tracking consumer interaction data associated with electronic marketing communications for promotions and processing the consumer interaction data. Repeated electronic marketing communications containing a promotion having high likelihood that one or more prior electronic marketing communications for the promotion will generate a purchase (e.g., as indicated by the impact score) may be avoided such that the repeated electronic marketing communications do not suffer diminishing returns. Electronic marketing communications for promotions that are more tailored to consumer interest may be provided in lieu of promotions determined to be less of interest (e.g., as indicated by the exploration score). Accordingly, promotional server 104 may be configured to provide electronic marketing communications including promotions that are more likely to result in a purchase.

An exemplary timing rule may specify a time period for providing an electronic marketing communication based on the "geographical freshness" of a promotion. "Geographical freshness" may refer to the geographical proximity of a promotion of interest to a consumer, for example, whether the promotion is located in a nearby downtown location, whether the promotions is located in a location in which the consumer has expressed interest in the past (as indicated by prior viewing or purchase activities), and the like.

An exemplary timing rule may be based on one or more events or activities scheduled on a consumer's calendar, for example, birthday reminders. A rule may associate each type of calendar event or activity to one or more promotion features that may be suitable. For example, a birthday reminder on a calendar may be associated with a gift store promotion. Exemplary embodiments may provide an electronic marketing communication for the relevant promotion within a certain period prior to the calendar event or activity.

An exemplary timing rule may be based on one or more events generally known, for example, Halloween. A rule may associate each type of event to one or more promotion features that may be suitable. For example, Halloween may be associated with a costume store promotion. Exemplary embodiments may provide an electronic marketing communication for the relevant promotion within a certain period prior to the event.

An exemplary timing rule may specify a time period for providing an electronic marketing communication based on whether current local context data or current consumer activity data was used in recommending the promotion. In many cases, promotions recommended based on current local context data are most relevant when the consumer is still in the same local context. Similarly, in many cases, promotions recommended based on current consumer activity data are most relevant when the consumer is still performing the same activity. As such, a timing rule may specify that electronic marketing communications for these promotions be provided as soon as possible or within a short time after which they are determined.

As an example of a use of current local context data, exemplary embodiments may analyze updated local context data to determine that a merchant has closed down. If a consumer's stored consumer activity data indicates that he/she purchases goods from that merchant, exemplary embodiments may automatically recommend a promotion for a different merchant selling the same goods in the vicinity of the consumer or the consumer's route.

An exemplary timing rule may specify a time period for providing an electronic marketing communication based on stored consumer activity data. For example, if a consumer purchases coffee every morning, then an electronic marketing communication for a coffee promotion may be provided in the morning.

An exemplary timing rule may specify a time period for providing an electronic marketing communication based on whether the electronic marketing communication is transactional, i.e., whether the electronic marketing communication is based on a prior transaction with a promotion. For example, for electronic marketing communications providing shipping or delivery confirmations, a timing rule may specify that such electronic marketing communications be provided as soon as possible without intended delay.

An exemplary timing rule may specify a time period for providing an electronic marketing communication based on the stored, current and/or predicted consumer activity data, for example, data related to usage of a mobile computing device by the consumer. For example, an electronic marketing communication may be provided only when the consumer is using the mobile computing device. Usage of the mobile computing device may be determined by detecting one or more current operational characteristics of the device. As another example, an electronic marketing communication may be provided when a consumer is unengaged with the mobile computing device. As another example, an electronic marketing communication may be provided when the mobile computing device is being viewed by a consumer, i.e., is not in the consumer's pocket. This may be determined based on an orientation of the mobile computing device as detected by a gyroscope that may be provided in the device. If the gyroscope data indicates that the mobile computing device is in a substantially horizontal orientation, then this might indicate that the consumer is not viewing or handling the device, and that an electronic marketing communication should not be sent at the time. Whether the consumer is viewing or handling the device may also be determined based on other factors, for example, the light conditions surrounding the device as detected by a light sensor. If the surroundings of the device is dark and the current time indicates that it is daytime, the system may determine that the device is in a pocket or bag and that the electronic marketing communication should not be sent at the time. As another example, an electronic marketing communication may not be provided when the current consumer activity data indicates that the consumer is driving.

As another example, if the current consumer activity data indicates that the consumer is interacting with the promotion and marketing service at a given time, then an electronic marketing communication may be provided during the interaction.

As yet another example, if the stored consumer activity data indicates that the consumer always interacts or views a consumer interface of the promotion and marketing service at a given time most days, then an electronic marketing communication may be provided at that time in the future.

As yet another example, an electronic marketing communication may be provided if a consumer has not used the promotion and marketing service in a certain period of time in order to incentivize the consumer to become a more engaged and active consumer.

In certain embodiments, a consumer may be enabled to set or modify one or more timing rules that will be used to provide him/her with electronic marketing communications of promotions.

One of ordinary skill in the art will recognize that the above exemplary timing rules may be used independently or in combination with one or more other timing rules.

VII. EXEMPLARY METHODS FOR PROGRAMMATIC TRANSMISSION OF ELECTRONIC MARKETING COMMUNICATIONS USING ELECTRONIC MARKETING COMMUNICATION CRITERIA

Some exemplary embodiments of methods to perform the functionality described herein with respect to programmatic generation of exemplary input data, the use of timing rules for programmatic generation of electronic marketing communications, and programmatic determination of when to send electronic marketing communications based on input data are described further below with respect to FIGS. 16-21.

Figure 16:
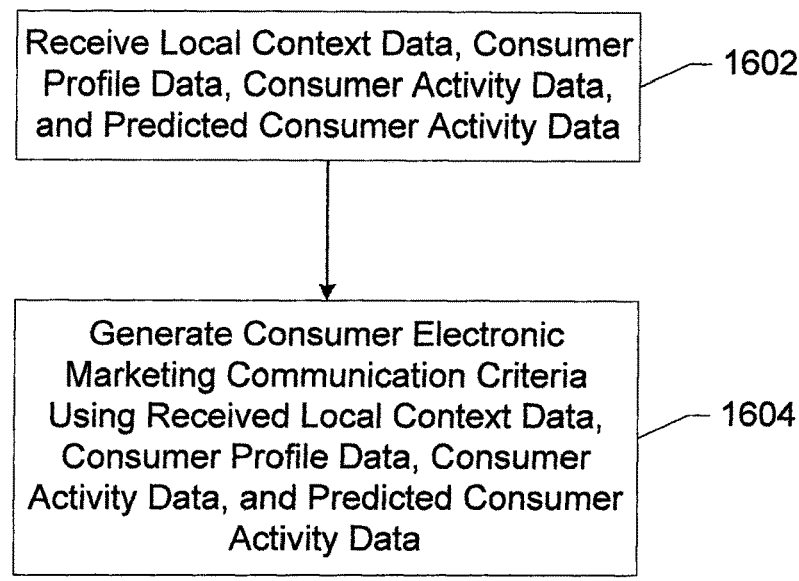
FIG. 16 is a flowchart illustrating an exemplary computer-executable method for generating a set of consumer electronic marketing communication criteria using received electronic data in accordance with some embodiments in accordance with some embodiments.

FIG. 16 is a flowchart illustrating an exemplary computer-executable method 1600 for generating a set of consumer electronic marketing communication criteria using received electronic data in accordance with some embodiments in accordance with some embodiments. As noted above, embodiments may employ a variety of timing rules and other criteria for determining whether, when, and how to transmit electronic marketing communications to consumers. To this end, embodiments may gather a variety of data to assist with this process, and generate a set of consumer electronic marketing communication criteria reflecting rules for what, how, and when to transmit electronic marketing communications to particular consumers, groups of consumers, and the like. The method 1600 illustrates an exemplary process that employs the use of local context data, consumer profile data, consumer activity data, and predicted consumer activity data to generate the consumer electronic marketing communication criteria.

The method begins at action 1602, where local context data, consumer profile data, consumer activity data, and predicted consumer data is gathered. These various data types may be gathered according to the various processes, methods, techniques described above using devices and apparatuses also as described above. At action 1604, the gathered data may be processed to synthesize a set of electronic marketing communication criteria associated with a particular user. In some embodiments, a given set of criteria is further associated with a particular promotion, promotion category, set of promotions, or the like. For example, the electronic marketing communication criteria may indicate that an electronic marketing communication for a particular promotion should be sent to the consumer upon the consumer entering or exiting a particular location, region, area, or the like (e.g., when the consumer is outside a predetermined commute path identified for the consumer).

In another example case, the electronic marketing communication criteria may determine that an electronic marketing communication should be sent in response to detecting that a mobile device associated with the consumer is active (e.g., in an unlocked state). For example, data received via the method 1600 may indicate that the consumer frequently activates their mobile device (e.g., to check their email) at particular times or frequencies throughout the day. In this regard, some consumers may check their mobile device more frequently than others, and this frequency may be noted and tracked by embodiments of the method 1800. Such a frequency may be employed to determine when to send electronic marketing communications. For example, a consumer who frequently checks their mobile device may have electronic marketing communications sent more frequently, while a consumer that checks their mobile device less frequently may have electronic marketing communications targeted to times of day when they are most likely to be active. As yet another example, the frequency with which a consumer activates their mobile device may be used to determine whether a timing rule or other time or activity based criteria is used to send electronic marketing communications to the mobile device at all. As yet a further example, some embodiments may track consumer activity across multiple devices, and attempt to target electronic marketing communications to particular devices most likely to be active at any given time. For example, if the consumer is commuting, then electronic marketing communications may be targeted to an application executing on the consumer's mobile device, while if the consumer is at home or work, then electronic marketing communications may be targeted to the consumer's email. Additional exemplary embodiments that employ a set of consumer electronic marketing communication criteria are described below with respect to FIGS. 17-21.

Figure 17:
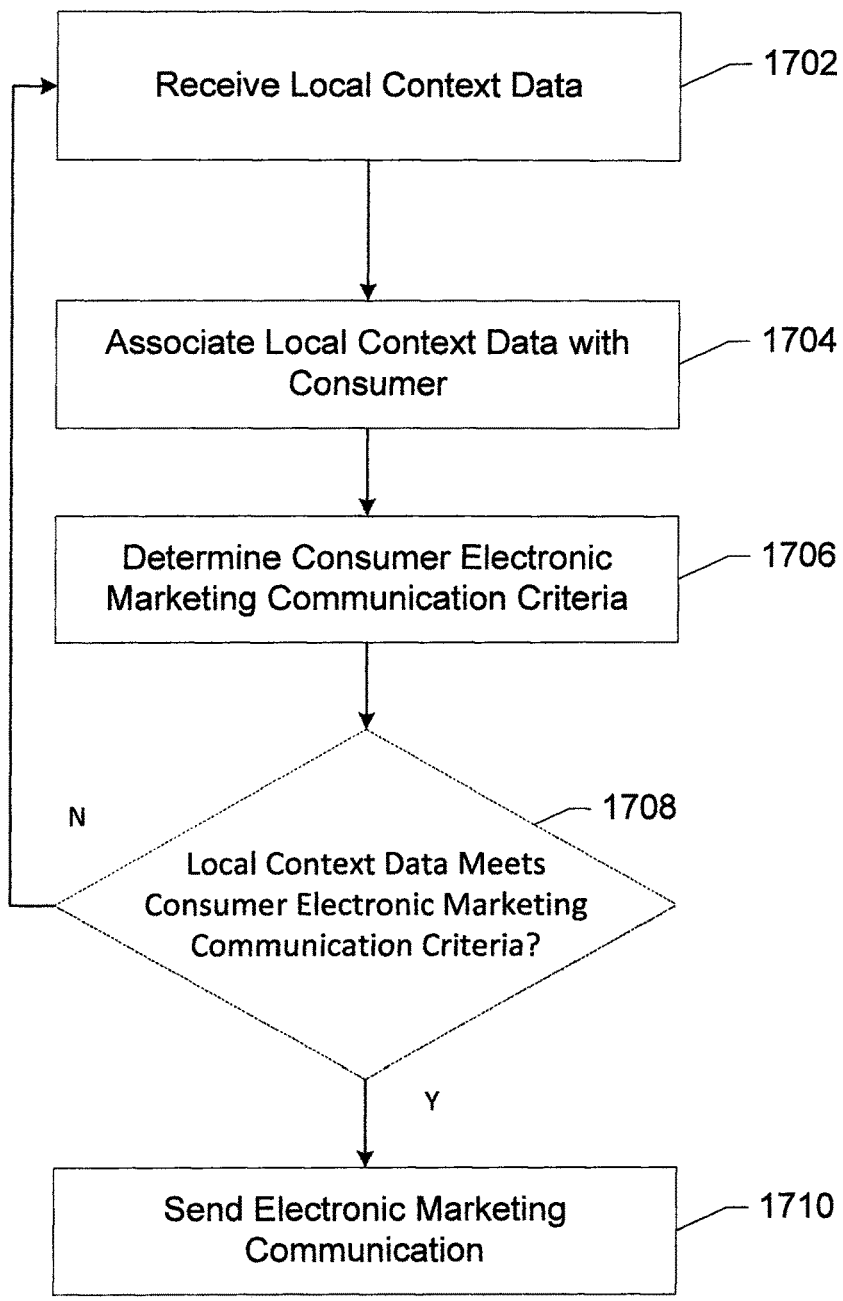
FIG. 17 is a flowchart illustrating an exemplary computer-executable method for using local context data to determine whether to send an electronic marketing communication based on electronic marketing communication criteria in accordance with some embodiments.

FIG. 17 is a flowchart illustrating an exemplary computer-executable method 1700 for using local context data to determine whether to send an electronic marketing communication based on electronic marketing communication criteria in accordance with some embodiments. As noted above with respect to FIG. 16, a set of electronic marketing communication criteria may be associated with a particular user, group of users, promotion, or the like, based on a variety of inputs. The method 1700 illustrates one manner of using such criteria to control whether and when to send an electronic marketing communication to a consumer based on local context data received from the consumer device. As described above, local context data may relate to a variety of different signals, inputs, and the like received from a consumer device. For example, local context data may include accelerometer readings, gyroscope readings, audio or video input, local-based services information, or the like. Embodiments may infer a variety of information from these signals, including, but not limited to, whether the consumer is actively using their mobile device, whether the consumer is on the morning commute, whether the consumer is outside of their normal travel area (e.g., on vacation), or the like. In this manner, embodiments may advantageously provide electronic marketing communications to the consumer at a time, place, and manner that is conducive to the consumer being able to view and act upon the electronic marketing communication.

The method 1700 begins at action 1702, where local context data is received. In the present context, local context data may typically be received from the consumer's mobile device. For example, the local context data may indicate the location of the mobile device, whether the consumer is holding the mobile device, whether the consumer is interacting with an input control of the mobile device (e.g., a touch pad or biometric interface), or the like. The local context data may be transmitted to a remote server for processing, such as the promotion and marketing service described above. At action 1704, the local context data is associated with a particular consumer. For example, the local context data may or may not include an identifier for the particular consumer, and in some cases the method 1700 may perform a lookup of a consumer identifier associated with a particular mobile device, a particular location, or some other criterion by which the consumer associated with the local context data may be identified.

At action 1706, a set of consumer electronic marketing communication criteria is determined based on the association of the local context data with the consumer. For example, a specific set of consumer electronic marketing communication criteria may be stored in a database indexed by identifiers for consumers. The consumer electronic marketing communication criteria may be personalized for that particular consumer, taking into account the consumer's preferences for times at which they access their mobile device or personal computer, commute times and locations, mobile device interaction preferences (e.g., how frequently the consumer accesses their mobile device during the day or checks their email), and the like.

At action 1708, the method determines whether the local context data is indicates that the consumer electronic marketing communication criteria has been met. For example, the method may determine that the consumer is at a location that is associated with a particular promotion, that the consumer is actively engaged with the mobile device, or any other criteria for sending an electronic marketing communication. If the criteria are met, the method proceeds to action 1710 where the electronic marketing communication is sent according to the various methods and techniques described above. If the criteria are not met by the local context data, the method returns to action 1702 to continue monitoring local context data.

As additional examples of using local context data, in some embodiments the method may determine that the consumer is at a particular merchant location associated with a promotion, and notify the consumer of the promotion in response. In another scenario, the local context data may indicate the consumer is at a particular merchant location, and the consumer may be notified of a promotion associated with a competitor of the particular merchant. In some embodiments, notification of a competitor promotion may only occur if the competitor has a location within a particular radius of the consumer's location as well. In some embodiments, the presence of a consumer at a particular location may result in transmission of electronic marketing communications related to the merchant such as advertisements for the merchant's specials, consumer-generated recommendations (e.g., reviews), menu data, local map data, or the like. In some embodiments, the decision to send a notification when a user is at a merchant location may be determined based on a notification score, such as by determining not to send a notification when the consumer is sitting at a particular merchant location, since the consumer has likely already committed to that particular merchant. In some embodiments, the threshold score for sending the electronic marketing communication may be determined based at least in part on a profitability of a promotion included in the electronic marketing communication for the merchant and/or promotion and marketing service sending the electronic marketing communication.

In some embodiments, a decision as to whether to send a given electronic marketing communication may further depend on other factors, such as a processing load on the promotion and marketing service. If the load is high, embodiments may ensure that mobile devices report local context data less frequently or that electronic marketing communications are sent less frequently.

In some embodiments, a threshold level for sending electronic marketing communications may be determined. This threshold may be dynamically adjusted based on factors such as the time of day, past notification history, and the like. In some embodiments, if the threshold level is set to a certain level that makes it unlikely that further notifications will be received (e.g., where the threshold is set very high), then embodiments may notify a mobile device that further electronic marketing communications will not be received for a period of time. For example, if several electronic marketing communications have been sent to the consumer's mobile device and the threshold for sending another electronic marketing communication has been set very high as a result, embodiments may send a signal to the mobile device to allow the mobile device to check for new electronic marketing communications less frequently (e.g., turning off "push" notifications temporarily) to reduce data usage and/or power consumption.

In some embodiments, the local context data may be used to determine the relative trip time position of the consumer. For example, embodiments may determine based on location histories, traffic patterns, and the like whether the consumer is traveling to a merchant ("pre-arrival") arriving at the merchant, mid-visit to the merchant, or departing the merchant.

Some embodiments may use local context data to identify other consumer activity patterns, such as which days the consumer goes out, which days the consumer stays home, when the consumer eats, exercises, goes to the movies, or the like. In some embodiments, the local context data may also be used in concert with data from third parties and/or other external sources. For example, data may be pulled from other components of a promotion and marketing service, payment systems providers (e.g., credit card companies, banks), credit reporting agencies, social networking websites or the like, and used in concert, in addition to, or instead of local context data to determine whether, when, and how to send electronic marketing communications to consumers. For example, embodiments may utilize data indicating user preferences as received form a social network website (e.g., "likes") to determine whether and when to send electronic marketing communications.

In yet further embodiments, the local context data may include data associated with various applications executing on a consumer's mobile device. For example, the local context data may obtain the consumer's browsing history from the mobile device, or obtain a tracking cookie identifier that allows for obtaining elements of the browsing history from another source (e.g., a web-tracking website). As another example, data may be obtained from a health and fitness app in which the consumer enters diet and exercise information. In this specific example, food preferences may be determined from diet information.

In some embodiments, local context data may be used to modify or otherwise adjust electronic marketing communications before they are sent out. For example, if the local context data indicates that the consumer is on a romantic or celebratory outing (e.g., based on a determination that the consumer is out of the house and the date is a birthday, anniversary, or the like as determined from other data, such as a social graph), then promotions may provided that relate to romantic or celebratory outings (e.g., by tagging appropriate promotions with "romantic").

Figure 18:
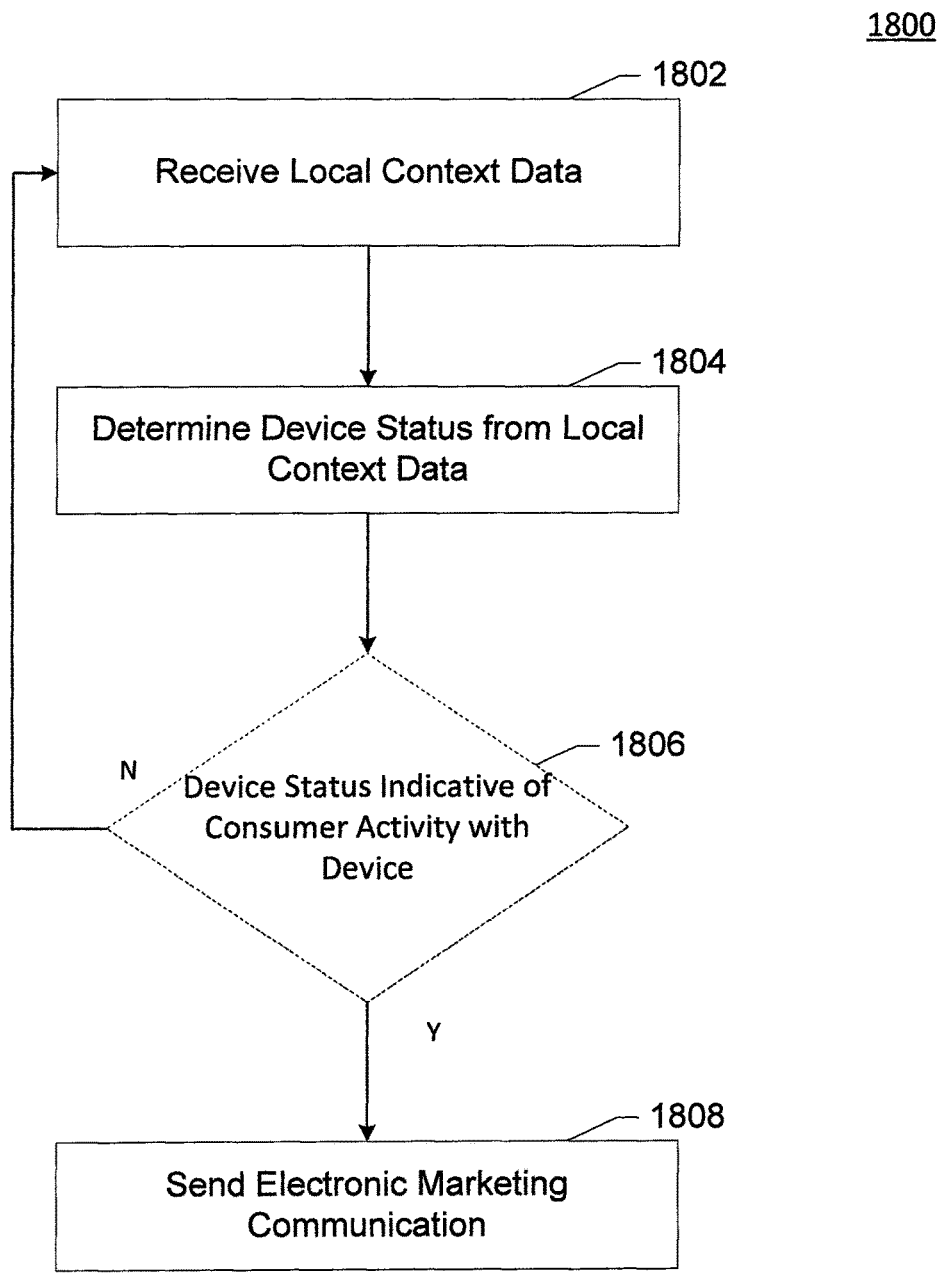
FIG. 18 is a flowchart illustrating an exemplary computer-executable method for using local context data to determine whether a consumer device status is appropriate for receiving a promotion as a criteria to send an electronic marketing communication in accordance with some embodiments.

FIG. 18 is a flowchart illustrating an exemplary computer-executable method 1800 for using local context data to determine whether a consumer device status is appropriate for receiving a promotion as a criteria to send an electronic marketing communication in accordance with some embodiments. As described above, embodiments may examine a consumer device status to determine whether and when to send an electronic marketing communication. In particular, the method 1800 illustrates that a consumer device status (e.g., whether a display of the device is active or whether the device is in an unlocked state) may be used to control whether an electronic marketing communication is sent by a promotion and marketing service to the mobile device. In this regard, signals associated with the device being active (e.g., accelerometer and gyroscope readings indicating the device has been picked up, signals indicating the display is powered on or the device is unlocked, etc.) may be sent as local context data and evaluated according to a set of consumer electronic marketing communication criteria. Such readings may also be employed in concert with other signals to improve the process of sending electronic marketing communications to consumers. For example, by determining that the consumer is at their work place and that their phone has been still for at least a threshold period of time, embodiments may determine that the consumer is sitting at their desk, or by determining that the consumer has traveled to a running track and the accelerometer is tracking frequent step counts, the consumer is running.

At action 1802, the method receives local context data. As described above, the local context data may include a variety of signals, but in the present example said data is considered to include data indicating that a mobile device is in an activate state or otherwise being actively engaged with by a consumer. At action 1804, the device status is determined based on the received local context data. For example, embodiments may determine that the accelerometer of the device is reading greater than a threshold value for greater than a threshold period of time, that a gyroscope indicates that the orientation of the mobile device has changed, that a camera on the phone is reading a brightness of greater than a threshold value, indicating that the mobile device is outside of the consumer's pocket, or the like. At action 1806, the method determines whether the device status determined at action 1804 is indicative of consumer activity using the device. Determining whether the device is active may be performed based on a single data indication contained within the local context data, or a plurality of conditions. For example, the method may determine that the consumer is engaged in activity with the device based on the device display being on, the device being unlocked, and at least one application being launched on the device. For example, the consumer electronic marketing communication criteria may include rules and settings that cause transmission of an electronic marketing communication in response to determining that the device is active.

At action 1808, an electronic marketing communication is sent in response to determining that the device status indicates that the consumer is engaged in an activity with the device. If the device status is not indicative of consumer activity with the device, the method returns to action 1802 to continue monitoring the local context data.

Figure 19:
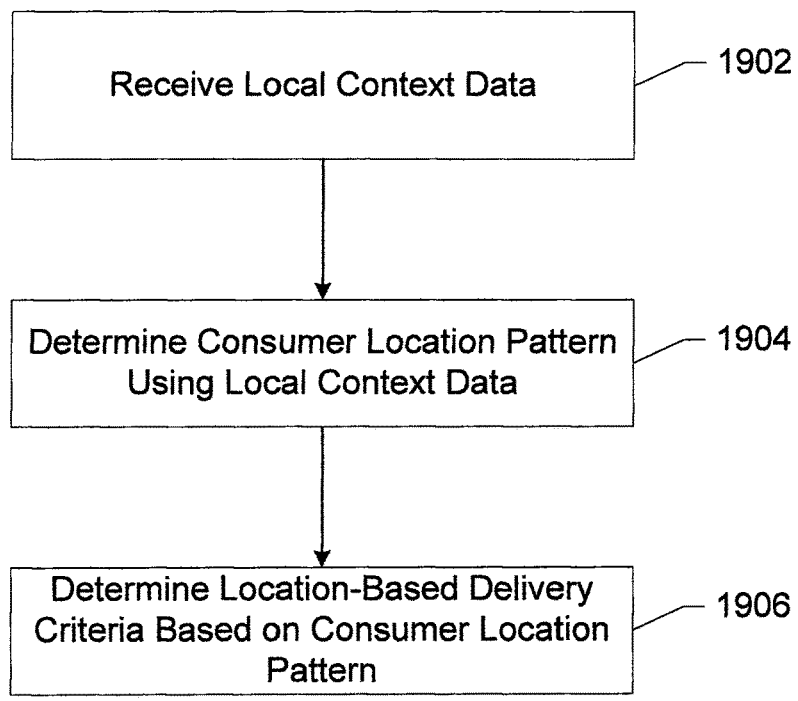
FIG. 19 is a flowchart illustrating an exemplary computer-executable method for using local context data to generate location-based delivery criteria in accordance with some embodiments.

FIG. 19 is a flowchart illustrating an exemplary computer-executable method 1900 for using local context data to generate location-based delivery criteria in accordance with some embodiments. As described above with respect, local context data may include signals from a location-based service component of a mobile device, indicating the location of the mobile device at a particular time. From this information, embodiments may determine consumer location patterns that indicate where the consumer is likely to be at any given time (e.g., the consumer's home, workplace, and daily commute). Such location patterns may be used to inform whether and when to send electronic marketing communications that are sent based on location-based criteria. For example, embodiments may determine the location and time of day that the user frequently leaves home and arrives at work based on detected patterns. If the user is on the way to work, the promotion and marketing service may avoid sending the consumer electronic marketing communications related to extra-curricular activities (e.g., spa treatments, massages, boxing lessons, romantic dinners) at businesses they pass by, as it is unlikely that a consumer will wish to stop for a spa treatment on their way to work, but they may be more interested in receiving an electronic marketing communications for a cup of coffee and a donut on the way to work. As such, certain promotions may be associated with particular criteria that turn on whether the consumer is at a particular location in relation to their usual travel pattern.

Similarly, other embodiments may determine that the consumer has deviated from their traditional pattern, and take appropriate action. For example, embodiments may detect that the consumer is on vacation by virtue of the fact that they have not taken their regular morning commute for the last three work days, and send location-based electronic marketing communications that may be of interest to a consumer on vacation.

Yet further embodiments may use location patterns to detect other consumer habits. For example, local context data may indicate that the consumer stops at a particular coffee shop every morning. A promotion for a competing coffee shop may have criteria requesting that an electronic marketing communication be sent to consumers who regularly visit the first coffee shop in an attempt to lure customers away.

Consumer location patterns may also be employed to determine geographic areas in which the consumer may be interested in receiving promotions. Systems that employ a radius (e.g., 10 miles) to determine relevant data to send to the consumer fail to take into account the fact that not all areas within a given radius are equally interesting to the consumer. For example, in New York City, a Manhattan resident is much less likely to be interested in a promotion that requires traveling over a bridge or through a tunnel than a promotion on the opposite end of the island, even if the two promotions are equidistant from the user. Similarly, some consumers may be reluctant to travel to certain neighborhoods or with/against certain traffic patterns. The use of consumer location patterns may thus determine particular travel habits of consumers and limit, constrain, or otherwise alter sending of electronic marketing communications based on those location patterns. For example, if a particular location pattern indicates that a consumer frequents a particular shopping district, then the consumer may be sent electronic marketing communications with promotions in that shopping district even if that district would otherwise be out of a standard radius from the consumer's home.

The method 1900 illustrates one example of a process for gathering information to construct a consumer location pattern that may be employed to make the determinations described above. In particular, the method begins at action 1902 where local context data is received. As described above, local context data in this example typically includes location data and time data indicating the location of the consumer (or the consumer's mobile device) at a given time.

At action 1904, a consumer location pattern is determined using the local context data. The consumer location pattern includes a plurality of locations and times which serve to indicate a pattern of behavior by the consumer. Frequently visited locations may be identified by the system and determined whether they are associated with a residence, a business, or the like in order to generate the consumer location pattern. Some embodiments may only have basic identifying information as to the type of location (e.g., expected residence vs. expected business), while other embodiments may include specific business names, business types, or the like.

At action 1906, the method determines a set of location-based delivery criteria based on the consumer location pattern. The location-based delivery criteria may be associated with a particular promotion or set of promotions (e.g., coffee promotions if the consumer is on their commute, shopping promotions if the consumer is in a shopping district during the work day). The location-based delivery criteria may then be saved as consumer electronic marketing communication criteria, or in addition to other consumer electronic marketing communication criteria. As such, it should be appreciated that while the location-based delivery criteria necessarily includes some sort of location (e.g., a location to be near, a location to avoid, a location radius from a point, a particular neighborhood or district, or the like), other criteria and signals may be evaluated as part of, in addition to, or in accordance with the location. For example, the location-based delivery criteria may include times, places, dates, travel goals or types (e.g., morning commute, evening commute, weekend tee time, or the like), or the like. The location-based delivery criteria may also include particular promotions, groups of promotions, and other content associated with different sets of rules and criteria. An example method for using such location-based delivery criteria is described further below with respect to FIG. 20.

Figure 20:
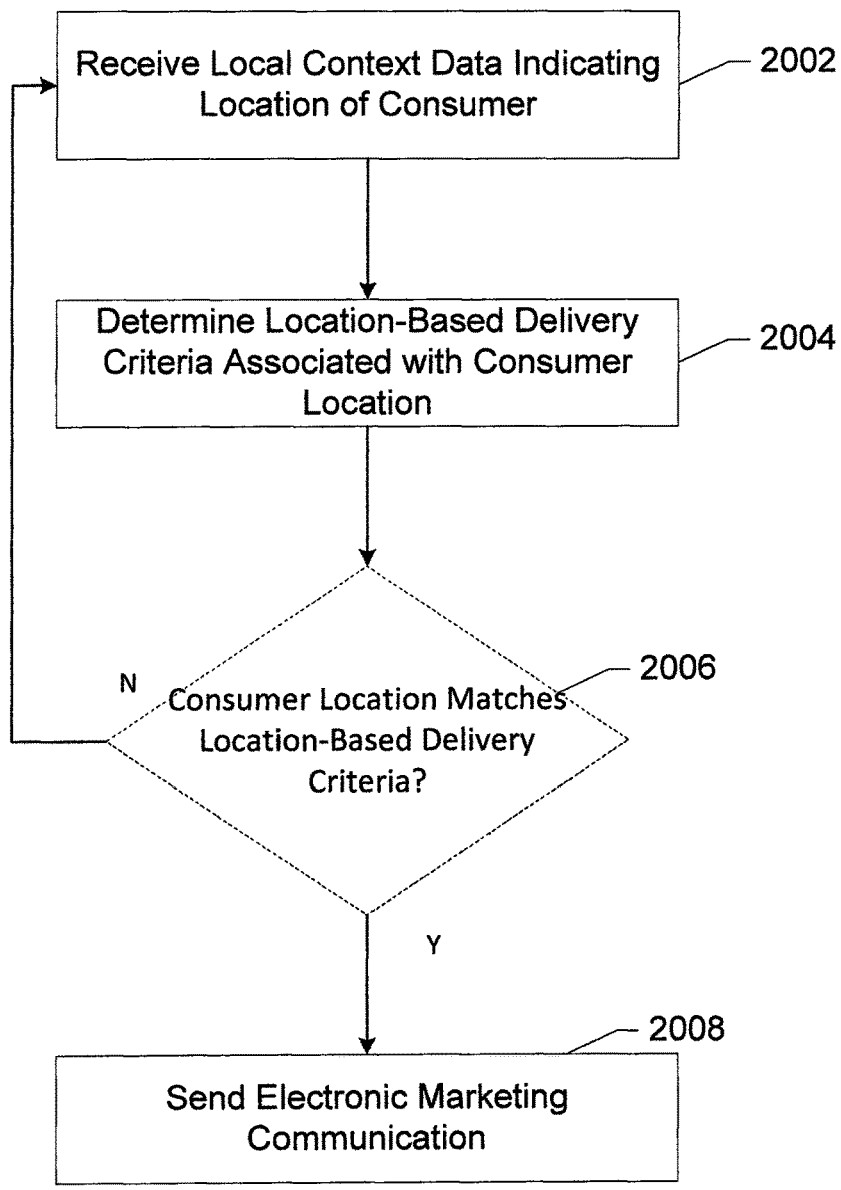
FIG. 20 is a flowchart illustrating an exemplary computer-executable method for using location-based delivery criteria in conjunction with local context data to determine whether to send an electronic marketing communication in accordance with some embodiments.

FIG. 20 is a flowchart illustrating an exemplary computer-executable method 2000 for using location-based delivery criteria in conjunction with local context data to determine whether to send an electronic marketing communication in accordance with some embodiments. As described above, location-based delivery criteria may be employed in a variety of scenarios to improve the likelihood that a given electronic marketing communication sent to a consumer will be relevant to the consumer when the consumer is present at the particular location at the particular time. The method 2000 uses these location-based delivery criteria to trigger the transmission of electronic marketing communications to consumers. It should be appreciated that although the instant examples relate to sending electronic marketing communications in response to receiving local context data indicating a location, other embodiments may utilize known or suspected location patterns to determine whether and when to transmit electronic marketing communications without actual awareness of the location of the mobile device based on received local context data. For example, if a consumer location pattern indicates they frequently travel to work at a certain time, then an electronic marketing communication associated with their commute pattern may be sent during the usual time of their commute even in circumstances where the consumer has disabled the location-based services component of their mobile device to conserve battery power.

The method begins at action 2002 by receiving local context data that indicates a location of a consumer, or the consumer's mobile device. At action 2004, the method 2000 determines any location-based delivery criteria associated with the consumer. As noted above, a given consumer, group of consumers, or the like may have multiple separate rules and cases that result in transmission of an electronic marketing communication. Action 2004 includes identifying such criteria so that it may be evaluated in connection with the received consumer location. For example, each promotion that may be sent to the consumer may be associated with different criteria, including location-based delivery criteria. At action 2006, a determination is made as to whether the consumer location matches the location-based delivery criteria. If the consumer location matches the location-based delivery criteria, an electronic marketing communication is sent at action 2008. If the consumer location does not match the location-based delivery criteria, the method returns to action 2002.

Figure 21:
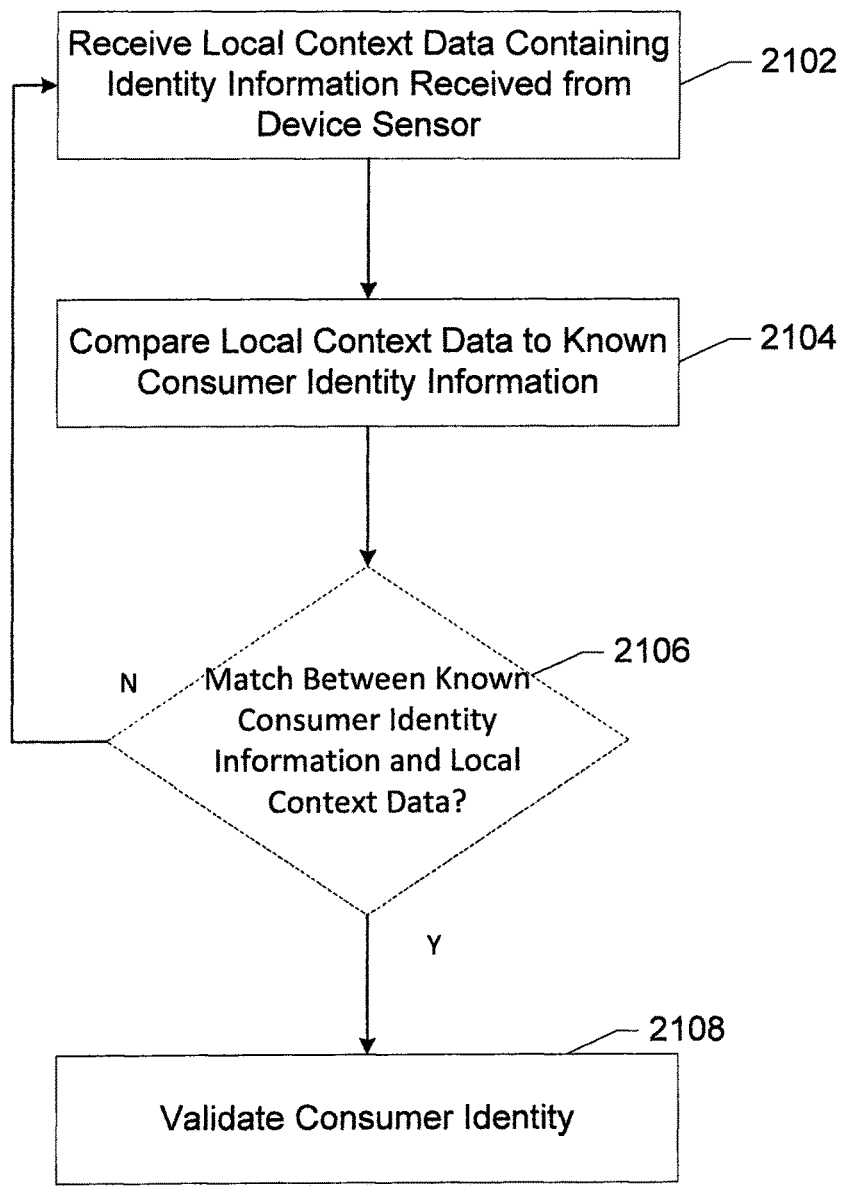
FIG. 21 is a flowchart illustrating an exemplary computer-executable method for using local context data to determine whether a consumer's identity is valid as a criteria to send an electronic marketing communication in accordance with some embodiments.

FIG. 21 is a flowchart illustrating an exemplary computer-executable method 2100 for using local context data to determine whether a consumer's identity is valid as a criteria to send an electronic marketing communication in accordance with some embodiments. As noted above, embodiments may receive local context data from a variety of mobile device sensors. This local context data may include information from touch screens, biometric and fingerprint scanners, signature pads, mobile wallet elements (e.g., near-field communication chips), and the like. These signals may be employed to identify and/or authenticate the identity of the user. Such authentication may be employed to determine whether the user is an authorized user to redeem a particular promotion. The method 2100 illustrates one example process for using local context data to authenticate a user. Authentication of the user may be employed in a variety of contexts, such as redeeming a promotion (e.g., by verifying the promotion is assigned to the consumer attempting to redeem it), registering for communications from a particular merchant, or the like.

At action 2102, the method receives local context data that includes signals from a mobile device sensor that may be used to validate the identity of the user of the device. For example, the local context data may include signals from a device fingerprint sensor, touch screen display (e.g., to capture a user signature or personal identification number entry), or the like. At action 2104, the method compares the received local context data to stored known consumer identity information. At action 2106, the method determines whether a match exists between the known consumer identity information and the received local context data. If the data matches, the consumer's identity is validated at action 2108. Otherwise the method returns to action 2102.

VIII. SPECIFIC, NON-LIMITING EXAMPLES

Certain non-limiting examples of the use of exemplary techniques are described below. These examples are presented for illustrative purposes and are not meant to limit the scope, capability and use of exemplary embodiments.

(a) Non-Limiting Example 1

A consumer, Dan, has not opened his mobile app for the promotion and marketing service in a few days. Based on his current consumer activity data (which includes his current location) and his stored consumer activity data (which includes his previous promotion purchase history), exemplary embodiments may determine that a newly launched promotion is relevant to Dan's interests. Given that Dan has not opened the mobile app in a few days, exemplary embodiments may determine that the newly launched promotion should be provided to Dan as soon as possible to incentivize him to use the promotion and marketing service.

(b) Non-Limiting Example 2

A consumer, Dan, was browsing a promotion for a vegan meal on his mobile app when he closed it. Based on his stored consumer activity data (which includes the fact that he viewed the vegan meal promotion), exemplary embodiments may determine that an electronic marketing communication for the promotion should be provided to Dan.

Exemplary embodiments may determine that an appropriate timing for providing the promotion is when the promotion is close to selling out.

(c) Non-Limiting Example 3

A consumer, Dan, activates an account on the promotion and marketing service but does not engage it in several days. Based on his stored consumer activity data (which includes the fact that he never purchased or viewed any promotions), exemplary embodiments may determine that a highly-discounted promotion (i.e., an incentive) should be provided to encourage Dan to use the promotion and marketing service. Exemplary embodiments may also determine that an electronic marketing communication for the promotion should be provided without any intentional delay to engage Dan as soon as possible.

(d) Non-Limiting Example 4

A consumer, Dan, is an engaged consumer who has a high viewing rate for the electronic marketing communications that he receives for breakfast restaurants, although he has not yet purchased any promotions. Based on his stored consumer activity data (which includes his high viewing rate for breakfast restaurants), his current consumer activity data (which includes his current location) and his consumer profile data (which includes his price preference), exemplary embodiments may determine that an electronic marketing communication for a newly launched promotion for a breakfast restaurant within Dan's price range and in his vicinity should be provided to Dan. Based on a characteristic of the promotion (that the promotion is for a breakfast restaurant), exemplary embodiments may determine that early morning is an appropriate time period to send the electronic marketing communication to Dan.

(e) Non-Limiting Example 5

A consumer, Dan, lives on the western edge of a bay. Based on his current local context data (which includes information on the geographical terrain and geographical obstacles in his vicinity), exemplary embodiments may determine that promotions offered at locations on the eastern edge of the bay are not suitable for Dan as he would have to travel around the bay to reach those locations. In this case, exemplary embodiments may limit promotions for Dan to those offered on the same western side of the bay.

(f) Non-Limiting Example 6

A consumer, Dan, visits a first coffee shop every morning. Based on his stored consumer activity data (which includes his locations and route of travel every morning), exemplary embodiments may use publicly available information on merchants along Dan's route to determine that he indeed visits the first coffee shop every morning. Exemplary embodiments may receive publicly or privately available information that the first coffee shop has closed. In this case, exemplary embodiments may notify Dan that the first coffee shop has closed and may also provide Dan with an electronic marketing communication containing a promotion for a second coffee shop that falls along his morning route.

IX. EXEMPLARY COMPUTING DEVICES

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 22:
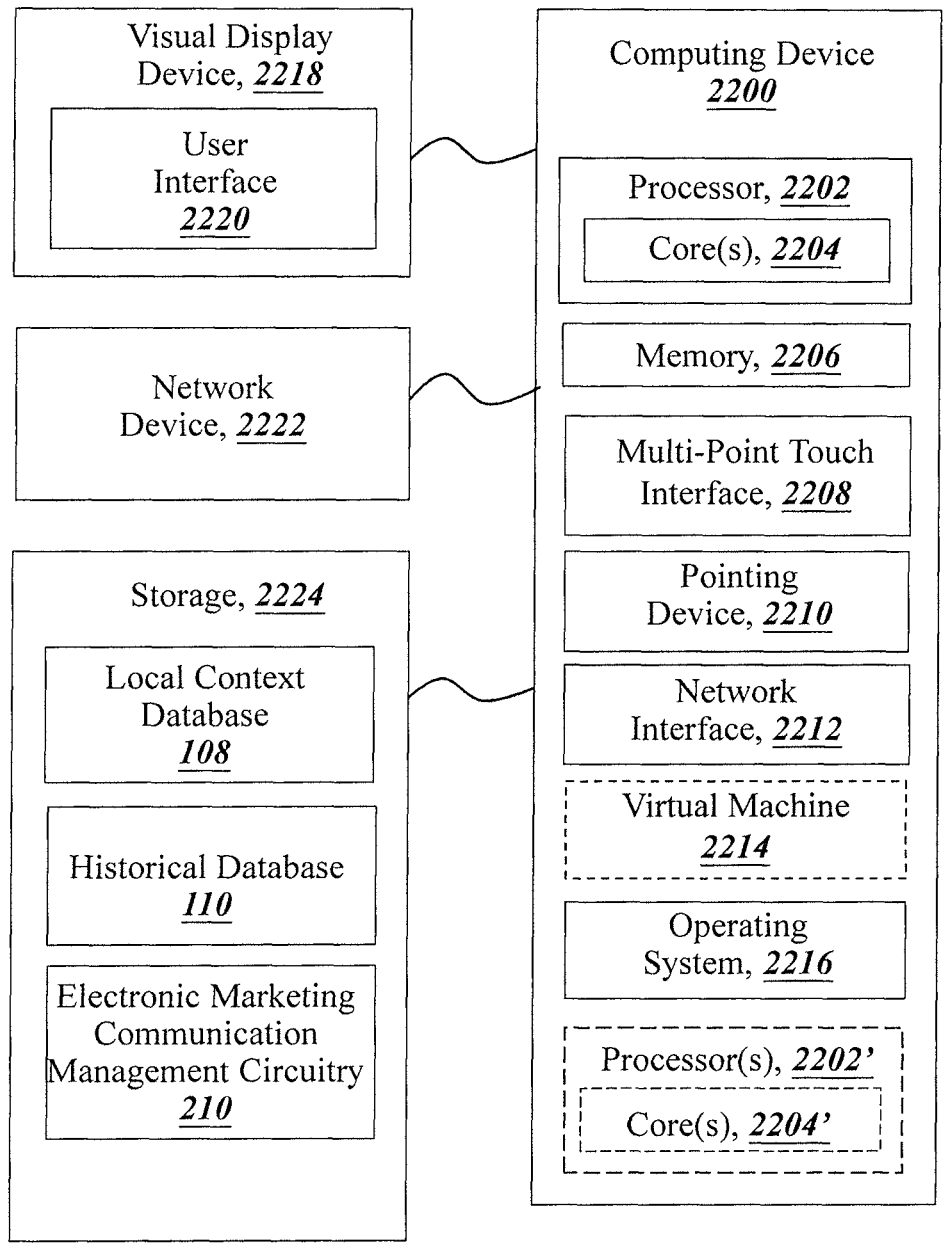
FIG. 22 is a block diagram of an exemplary computing device that may be used to implement and execute exemplary computer-executable methods in accordance with some embodiments.

FIG. 22 depicts a block diagram representing an exemplary computing device 2200 that may be used to implement the systems and methods disclosed herein. The computing device 2200 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 2200 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 2206 included in the computing device 2200 may store computer-readable and computer-executable instructions or software for implementing a graphical user interface as described herein. The computing device 2200 also includes processor 2202 and associated core 2204, and in some embodiments, one or more additional processor(s) 2202' and associated core(s) 2204' (for example, in the case of computer systems having multiple processors/cores), for executing computer-readable and computer-executable instructions or software stored in the memory 2202 and other programs for controlling system hardware. Processor 2202 and processor(s) 2202' may each be a single core processor or a multiple core (2204 and 2204') processor.

Virtualization may be employed in the computing device 2200 so that infrastructure and resources in the computing device may be shared dynamically. A virtual machine 2214 may be provided to handle a process running on multiple processors so that the process appears to be using only one computing resource rather than multiple computing resources. Multiple virtual machines may also be used with one processor.

Memory 2206 may include a computer system memory or random access memory, such as DRAM, SRAM, EDO RAM, and the like. Memory 2006 may include other types of memory as well, or combinations thereof.

A user may interact with the computing device 2200 through a visual display device 2218, such as a screen or monitor, which may display one or more graphical user interfaces 2220 provided in accordance with exemplary embodiments described herein. The visual display device 2218 may also display other aspects, elements and/or information or data associated with exemplary embodiments.

The computing device 2200 may include other I/O devices for receiving input from a user, for example, a keyboard or any suitable multi-point touch interface 2208 or pointing device 2210 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 2208 and the pointing device 2210 may be coupled to the visual display device 2218. The computing device 2200 may include other suitable conventional I/O peripherals. The I/O devices may facilitate implementation of the one or more graphical user interfaces 2020, for example, implement one or more of the graphical user interfaces described herein.

The computing device 2200 may include one or more storage devices 2224, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 2224 may provide storage for data that may be generated by the systems and methods of the present disclosure. For example, a storage device 2224 may provide storage for a local context database 108, a historical database 110 and an electronic marketing communication management circuitry 210. The one or more storage devices 2224 may be provided on the computing device 2200 and/or provided separately or remotely from the computing device 2200. The exemplary components depicted as being stored on storage device 2224 may be stored on the same or on different storage devices.

The computing device 2200 may include a network interface 2212 configured to interface via one or more network devices 2222 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 2212 may include a built-in network adapter, network interface card, PCMCIA network card, card bus network adapter, wireless network adapter, USB network adapter, modem or any other device suitable for interfacing the computing device 2200 to any type of network capable of communication and performing the operations described herein. The network device 2222 may include one or more suitable devices for receiving and transmitting communications over the network including, but not limited to, one or more receivers, one or more transmitters, one or more transceivers, one or more antennae, and the like.

The computing device 2200 may run any operating system 2216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 2216 may be run in native mode or emulated mode. In an exemplary embodiment, the operating system 2216 may be run on one or more cloud machine instances.

One of ordinary skill in the art will recognize that exemplary computational system 2200 may include more or fewer components than those shown in FIG. 22.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer components than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The entire contents of all references, including patents, patent applications and non-patent publications, cited throughout this application are hereby incorporated herein by reference in their entirety. The appropriate components and methods of those references may be selected for the invention and embodiments thereof. Still further, the components and methods identified in the following attached documents and all of their enclosures, attachments and appendices are integral to this disclosure and may be used in conjunction with or substituted for components and methods described elsewhere in the disclosure within the scope of the invention.

What is claimed is:

1. An apparatus comprising at least one processor and at least one memory storing instructions that, with the at least one processor, cause the apparatus to:
   determine, via the at least one processor, a threshold promotion score for a consumer based on at least a consumer segment associated with consumer profile data of the consumer;
   dynamically adjust, via the at least one processor, the threshold promotion score based on a current time data and current consumer activity data associated with a mobile computing device of the consumer;
   generate, via the at least one processor, a promotion score for each promotion of a plurality of promotions utilizing a machine learning system configured to:
      receive data inputs for the consumer;
      generate a multidimensional vector based on the data inputs;
      programmatically execute a trained machine learning algorithm based on the multidimensional vector;
      generate a probability value; and
      determine the promotion score based on the probability value;
   generate, via the at least one processor, one or more electronic marketing communications associated with the plurality of promotions based on the promotion score and a suitable time period for providing the one or more electronic marketing communications to a mobile computing device; and
   transmit, via the at least one processor and a network during the suitable time period associated with the promotion, an electronic marketing communication to the mobile computing device associated with the consumer, wherein the electronic marketing communication comprises a promotion selected based on an associated promotion score and is transmitted based on at least the associated promotion score and the threshold promotion score associated with the consumer to which the electronic marketing communication is transmitted, during the suitable time period associated with the promotion.

2. The apparatus of claim 1, wherein the at least one memory storing the instructions that, with the at least one processor, further cause the apparatus to:
   determine, via the at least one processor, a plurality of suitable time periods for transmitting electronic marketing communications to the mobile computing device, wherein each suitable time period is associated with a promotion of the plurality of promotions and is selected from one or more candidate time periods based on one or more timing rules.

3. The apparatus of claim 1, wherein the at least one memory storing the instructions that, with the at least one processor, further cause the apparatus to:
   receive, via the at least one processor, promotion data indicative of the plurality of promotions.

4. The apparatus of claim 1, wherein the at least one memory storing the instructions that, with the at least one processor, further cause the apparatus to:
   determine, via the at least one processor, promotion scores for each promotion of the plurality of promotions.

5. The apparatus of claim 1, wherein the suitable time period for providing the electronic marketing communications to the mobile computing device is determined based on at least one promotion of the plurality of promotions and one or more timing rules.

6. The apparatus of claim 1, wherein a timing rule of the one or more timing rules is associated with a predictive temporal model that relates a predicted consumer purchase probability at each candidate time period of the one or more candidate time periods to one or more of:
   the consumer profile data associated with the consumer;
   a stored consumer activity data associated with the consumer;
   the current consumer activity data associated with the consumer;
   a current local context data associated with the consumer; or
   a predicted consumer activity data associated with the consumer.

7. The apparatus of claim 1, wherein the electronic marketing communication comprising a promotion selected from the plurality of promotions based on an associated promotion score.

8. A non-transitory computer-readable media having encoded thereon computer-executable instructions for performing a method for providing electronic marketing communications to a mobile computing device associated with a consumer, the method comprising:
 determining, via at least one processor, a threshold promotion score for a consumer based on at least a consumer segment associated with consumer profile data of the consumer;
 dynamically adjusting, via the at least one processor, the threshold promotion score based on a current time data and current consumer activity data associated with a mobile computing device of the consumer;
 generating, via the at least one processor, a promotion score for each promotion of a plurality of promotions utilizing a machine learning system configured to:
  receive data inputs for the consumer;
  generate a multidimensional vector based on the data inputs;
  programmatically execute a trained machine learning algorithm based on the multidimensional vector;
  generate a probability value; and
  determine the promotion score based on the probability value;
 generating, via the at least one processor, one or more electronic marketing communications associated with the plurality of promotions based on the promotion score and a suitable time period for providing the one or more electronic marketing communications to a mobile computing device; and
 transmitting, via the at least one processor and a network during the suitable time period associated with the promotion, an electronic marketing communication to the mobile computing device associated with the consumer, wherein the electronic marketing communication comprises a promotion selected based on an associated promotion score and is transmitted based on at least the associated promotion score and the threshold promotion score associated with the consumer to which the electronic marketing communication is transmitted, during the suitable time period associated with the promotion.

9. The non-transitory computer-readable media of claim 8, wherein the computer-executable instructions for performing the method for providing electronic marketing communications to a mobile computing device associated with a consumer, the method further comprising:
 determining, via the at least one processor, a plurality of suitable time periods for transmitting electronic marketing communications to the mobile computing device, wherein each suitable time period is associated with a promotion of the plurality of promotions and is selected from one or more candidate time periods based on one or more timing rules.

10. The non-transitory computer-readable media of claim 8, wherein the computer-executable instructions for performing the method for providing electronic marketing communications to a mobile computing device associated with a consumer, the method further comprising:
 receiving, via the at least one processor, promotion data indicative of the plurality of promotions.

11. The non-transitory computer-readable media of claim 8, wherein the computer-executable instructions for performing the method for providing electronic marketing communications to a mobile computing device associated with a consumer, the method further comprising:
 determining, via the at least one processor, promotion scores for each promotion of the plurality of promotions.

12. The non-transitory computer-readable media of claim 8, wherein the suitable time period for providing the electronic marketing communication to the mobile computing device is determined based on at least one promotion of the plurality of promotions and one or more timing rules.

13. The non-transitory computer-readable media of claim 8, wherein a timing rule of the one or more timing rules is associated with a predictive temporal model that relates a predicted consumer purchase probability at each candidate time period of the one or more candidate time periods to one or more of:
 the consumer profile data associated with the consumer;
 a stored consumer activity data associated with the consumer;
 the current consumer activity data associated with the consumer;
 a current local context data associated with the consumer; or
 a predicted consumer activity data associated with the consumer.

14. The non-transitory computer-readable media of claim 8, wherein the electronic marketing communication comprising a promotion selected from the plurality of promotions based on an associated promotion score.

15. A computer system, comprising:
 a storage device configured to store:
  promotion data indicative of a plurality of promotions,
  consumer profile data,
  stored consumer activity data, and at least one of:
   current consumer activity data,
   current local context data, or
   predicted consumer activity data; and
  processing circuitry comprising at least one processor configured to:
 determine, via the at least one processor, a threshold promotion score for a consumer based on at least a consumer segment associated with the consumer profile data of the consumer;
 dynamically adjust, via the at least one processor, the threshold promotion score based on a current time data and the current consumer activity data associated with a mobile computing device of the consumer;
 generate, via the at least one processor, a promotion score for each promotion of a plurality of promotions utilizing a machine learning system configured to:
 receive data inputs for the consumer;
 generate a multidimensional vector based on the data inputs;
 programmatically execute a trained machine learning algorithm based on the multidimensional vector;
 generate a probability value; and
 determine the promotion score based on the probability value;
 generate, via the at least one processor, one or more electronic marketing communications associated with the plurality of promotions based on the promotion score and a suitable time period for providing the one or more electronic marketing communications to a mobile computing device; and
 transmit, via the at least one processor and a network during the suitable time period associated with the promotion, an electronic marketing communication to the mobile computing device associated with the consumer, wherein the electronic marketing communication comprises a promotion selected based on an associated promotion score and is transmitted based on at least the associated promotion score and the threshold promotion score associated with the consumer to which the electronic marketing communication is transmitted, during the suitable time period associated with the promotion.

16. The computer system of claim 15, wherein the processing circuitry comprising the at least one processor is further configured to:
   determine, via the at least one processor, a plurality of suitable time periods for transmitting electronic marketing communications to the mobile computing device, wherein each suitable time period is associated with a promotion of the plurality of promotions and is selected from one or more candidate time periods based on one or more timing rules.

17. The computer system of claim 15, wherein the processing circuitry comprising the at least one processor is further configured to:
   receive, via the at least one processor, promotion data indicative of the plurality of promotions.

18. The computer system of claim 15, wherein the processing circuitry comprising the at least one processor is further configured to:
   determine, via the at least one processor, promotion scores for each promotion of the plurality of promotions.

19. The computer system of claim 15, wherein the suitable time period for providing the electronic marketing communications to the mobile computing device is determined based on at least one promotion of the plurality of promotions and one or more timing rules.

20. The computer system of claim 15, wherein a timing rule of the one or more timing rules is associated with a predictive temporal model that relates a predicted consumer purchase probability at each candidate time period of the one or more candidate time periods to one or more of:
   the consumer profile data associated with the consumer;
   the stored consumer activity data associated with the consumer;
   the current consumer activity data associated with the consumer;
   the current local context data associated with the consumer; or
   the predicted consumer activity data associated with the consumer.

* * * * *